(12) United States Patent
Kanakasabai et al.

(10) Patent No.: US 12,206,262 B2
(45) Date of Patent: Jan. 21, 2025

(54) PULSE WIDTH COMMUNICATION IN A WIRELESS POWER SYSTEM

(71) Applicant: GE Intellectual Property Licensing, LLC, Niskayuna, NY (US)

(72) Inventors: Viswanathan Kanakasabai, Bangalore (IN); Rupam Basak, Howrah (IN); Suma Memana Narayana Bhat, Bangalore (IN); Subbarao Tatikonda, Bangalore (IN)

(73) Assignee: Dolby Laboratories Inc., San Francisco, CA (US)

( * ) Notice: Subject to any disclaimer, the term of this patent is extended or adjusted under 35 U.S.C. 154(b) by 0 days.

(21) Appl. No.: 18/256,539

(22) PCT Filed: Dec. 8, 2021

(86) PCT No.: PCT/US2021/062377
§ 371 (c)(1),
(2) Date: Jun. 8, 2023

(87) PCT Pub. No.: WO2022/125644
PCT Pub. Date: Jun. 16, 2022

(65) Prior Publication Data
US 2024/0030754 A1 Jan. 25, 2024

(30) Foreign Application Priority Data
Dec. 8, 2020 (IN) .............................. 202011053481

(51) Int. Cl.
*H02J 50/80* (2016.01)
*H02J 50/10* (2016.01)
(Continued)

(52) U.S. Cl.
CPC .............. *H02J 50/80* (2016.02); *H02J 50/10* (2016.02); *H02J 50/60* (2016.02); *H04L 25/4902* (2013.01)

(58) Field of Classification Search
CPC . H02J 50/10; H02J 50/60; H02J 50/80; H04L 25/4902
(Continued)

(56) References Cited

U.S. PATENT DOCUMENTS

| 9,954,402 B2 | 4/2018 | Brohlin et al. |
| 10,128,688 B2 | 11/2018 | Von Noval, III et al. |

(Continued)

FOREIGN PATENT DOCUMENTS

| JP | 2016534705 | 11/2016 |
| JP | 2016536959 | 11/2016 |

(Continued)

OTHER PUBLICATIONS

"PCT Application No. PCT/US2021/062377 International Search Report and Written Opinion", Mar. 24, 2022, 9 pages.
(Continued)

*Primary Examiner* — Hal Kaplan
(74) *Attorney, Agent, or Firm* — DeLizio, Peacock, Lewin & Guerra, LLP

(57) ABSTRACT

This disclosure provides systems, methods and apparatuses for a new communication technique between a wireless power transmission apparatus and a wireless power reception apparatus. The new communication technique may be more efficient for communication of a feedback parameter or other control information compared to a legacy packet-based digital communication technique. The new communication technique may use a pulse width modulation (PWM) signal as an analog representation of a feedback parameter or other control information. In some implementations, the PWM (Continued)

communication technique in this disclosure can be used for a variety of control or feedback information from the wireless power reception apparatus to the wireless power transmission apparatus. Furthermore, in some implementations, the PWM communication technique may be used for feedforward information from the wireless power transmission apparatus to the wireless power reception apparatus.

20 Claims, 16 Drawing Sheets

(51) Int. Cl.
*H02J 50/60* (2016.01)
*H04L 25/49* (2006.01)

(58) Field of Classification Search
USPC .......................................................... 307/104
See application file for complete search history.

(56) References Cited

U.S. PATENT DOCUMENTS

| 10,164,482 | B2* | 12/2018 | Park | H02J 7/00034 |
| 2013/0042570 | A1 | 2/2013 | Hanson | |
| 2016/0233728 | A1 | 8/2016 | Park et al. | |

FOREIGN PATENT DOCUMENTS

| JP | 2018113849 | 7/2018 |
| JP | 2020516215 | 5/2020 |
| WO | 2022125644 | 6/2022 |

OTHER PUBLICATIONS

Mao, et al., "Simultaneous Wireless Power Transfer and Data Communication Using Synchronous Pulse-Controlled Load Modulation", Measurement (Lond) Oct. 2017; 109: 316-325., Oct. 2017, 26 pages.

"Japan patent Application No. 2023-534590 1st Office Action".

* cited by examiner

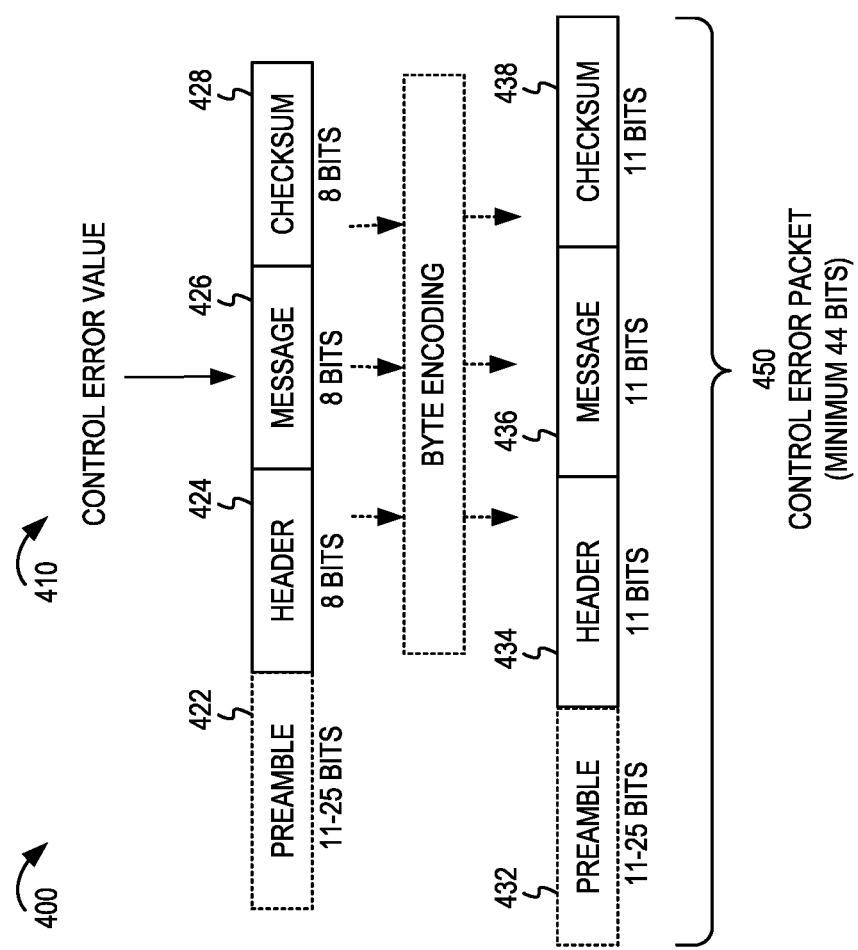
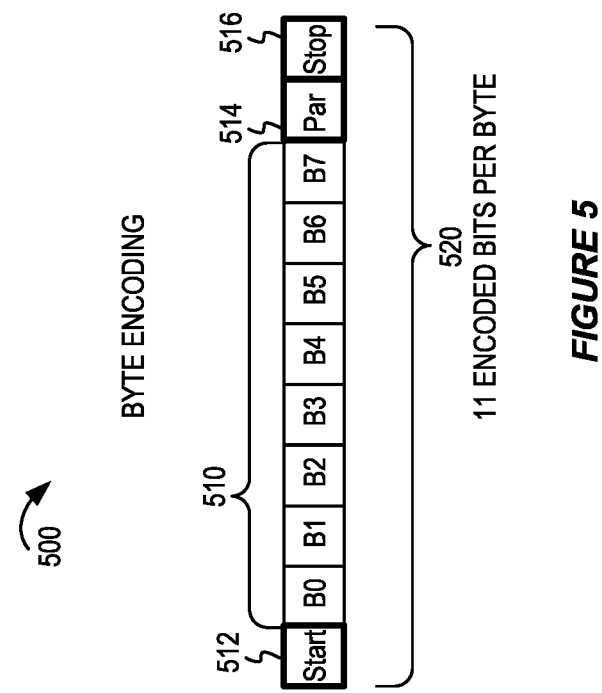
FIGURE 5
FIGURE 4

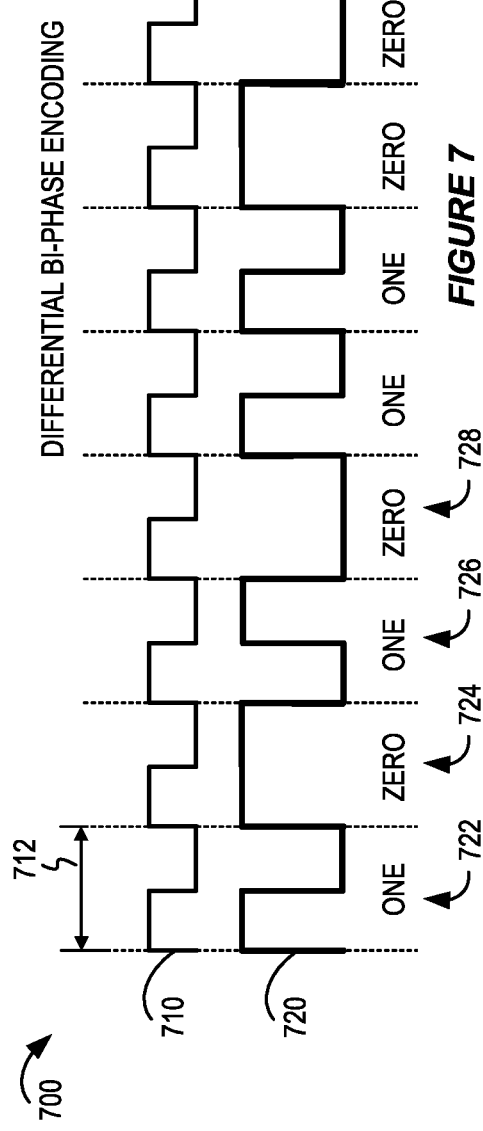
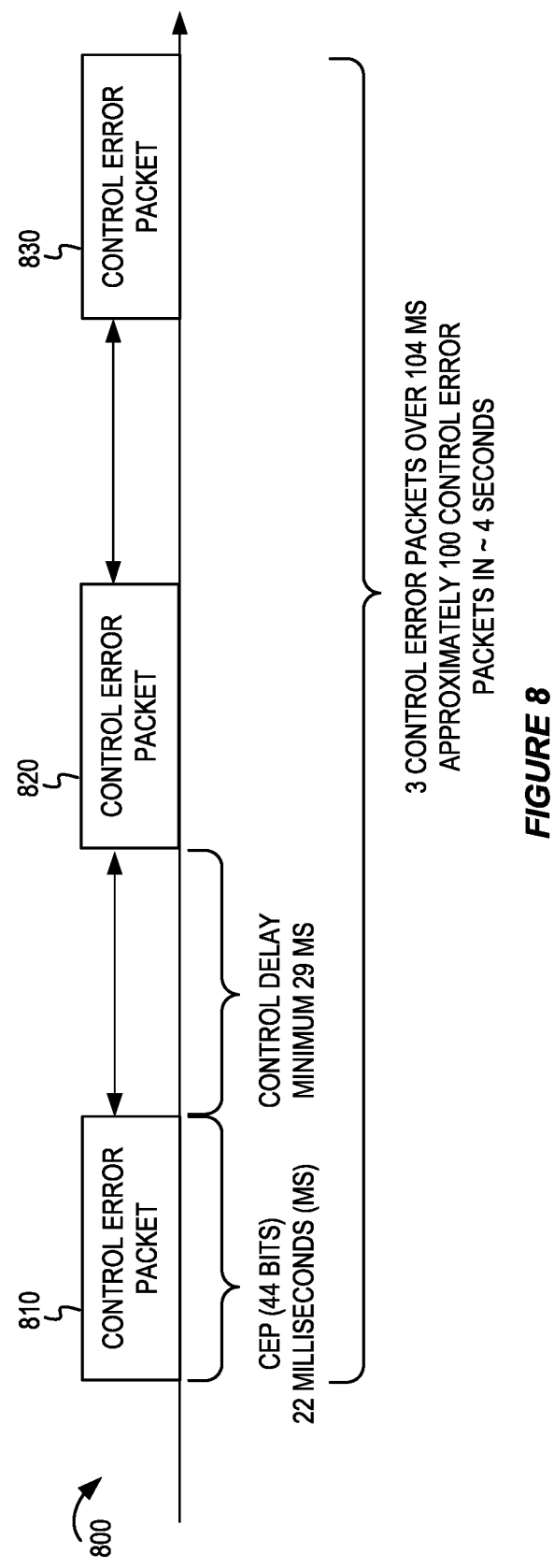

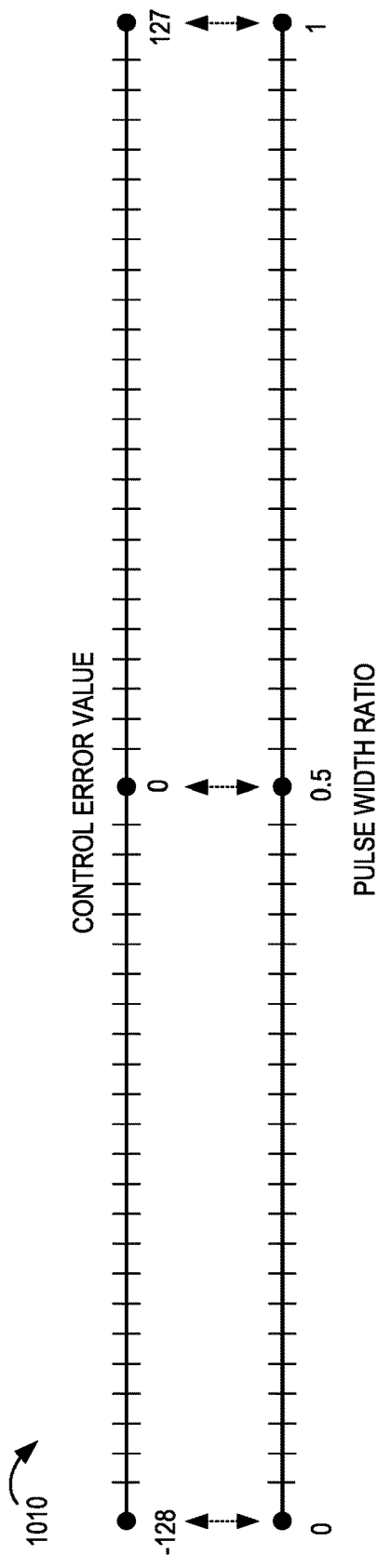
*FIGURE 10*
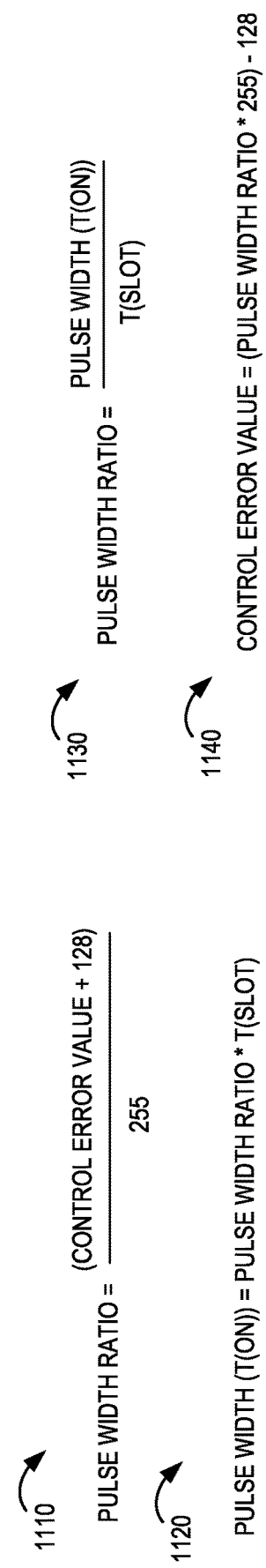
*FIGURE 11A*
*FIGURE 11B*

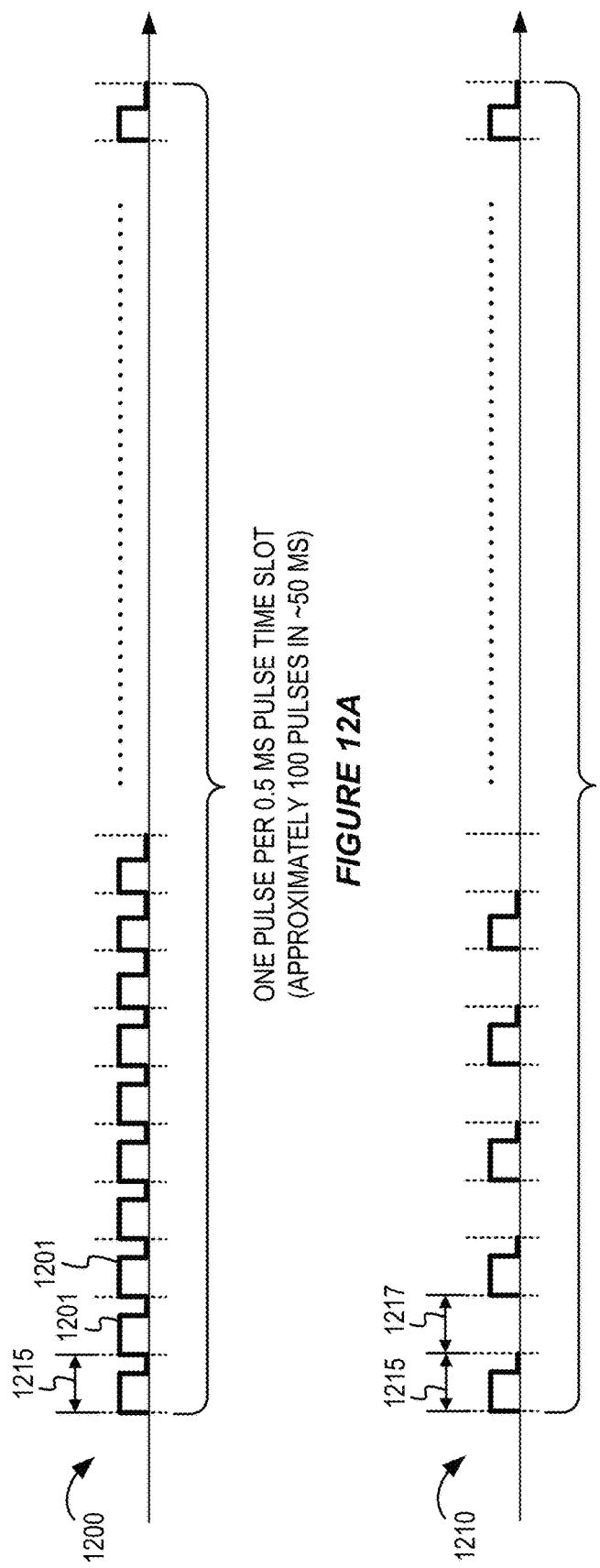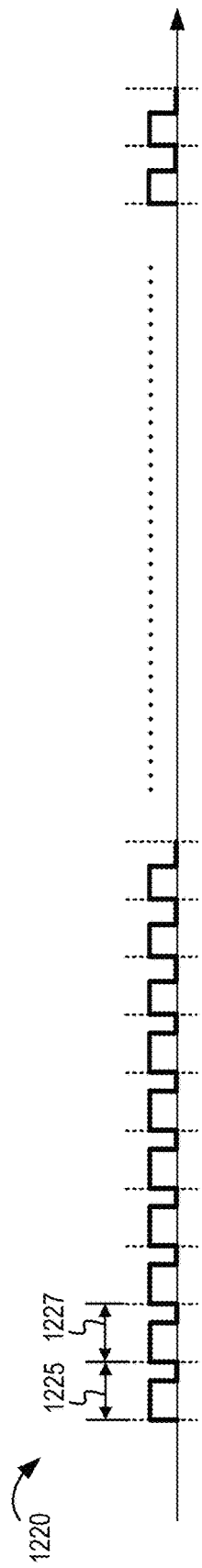
*FIGURE 12A*
*FIGURE 12B*
*FIGURE 12C*

PULSE WIDTH COMMUNICATION IN A WIRELESS POWER SYSTEM

RELATED APPLICATIONS

This application is a national stage of International Application No. PCT/US2021/062377, filed Dec. 8, 2021, which claims the benefit of priority to India patent application No. 202011053481, filed Dec. 8, 2020, the disclosures of which are incorporated herein by reference.

TECHNICAL FIELD

This disclosure relates generally to wireless power. More specifically, this application relates to communication between a wireless power reception apparatus and a wireless power transmission apparatus.

DESCRIPTION OF RELATED TECHNOLOGY

Wireless power technology has been developed to enable the wireless transmission of power from a wireless power transmission apparatus to a wireless power reception apparatus. Examples of a wireless power reception apparatus may include a mobile device, a small electronic device, a computer, a tablet, a gadget, an appliance (including some types of cordless blenders, kettles, mixers, etc.), and some types of larger electronic devices, among other examples. A wireless power transmission apparatus may include a primary coil that produces an electromagnetic field. The electromagnetic field may induce a voltage in a secondary coil of a wireless power reception apparatus when the secondary coil is placed in proximity to the primary coil. In this configuration, the electromagnetic field may wirelessly transfer power to the secondary coil. The power may be transferred using inductive coupling or resonant coupling between the primary coil and the secondary coil. Wireless power transmission may also be referred to as a contactless power transmission or a non-contact power transmission.

When performing a wireless power transmission, a wireless power transmission apparatus should stop the power transmission when a wireless power reception apparatus is removed from a charging area. A wireless power transmission apparatus may detect the presence of the wireless power reception apparatus during the transmission of power and enable changes to an operating point of a wireless power signal based on a control signal such as a control error packet. For example, a wireless power transmission apparatus may detect that a wireless power reception apparatus has been removed from the charging area when the control error packet is not received for a predetermined period (such as, 1.8 seconds). Furthermore, the control error packet may include information that causes a wireless power transmission apparatus to modify an amount of power, current, voltage, or another parameter. Similarly, a wireless power transmission apparatus may communicate information to a wireless power reception apparatus relevant to the wireless power transmission. Existing techniques for communication between a wireless power reception apparatus and a wireless power transmission apparatus may benefit from improvements.

SUMMARY

The systems, methods, and apparatuses of this disclosure each have several innovative aspects, no single one of which is solely responsible for the desirable attributes disclosed herein.

One innovative aspect of the subject matter described in this disclosure can be implemented as a method for wireless power transmission. In some implementations, the method may be performed by a wireless power transmission apparatus. The method may include transmitting wireless power to a wireless power reception apparatus via at least one primary coil. The method may include receiving a pulse width modulation (PWM) signal from the wireless power reception apparatus. The PWM signal may include one or more pulses. The method may include determining a feedback parameter based on a pulse width of the one or more pulses. The method may include managing a transmission of the wireless power from the wireless power transmission apparatus to the wireless power reception apparatus based, at least in part, on the feedback parameter.

In some implementations, the feedback parameter is a control error value. Managing the transmission of the wireless power may include setting an operating point for the transmission of the wireless power based, at least in part, on the control error value.

In some implementations, the feedback parameters indicate a load power. Managing the transmission of the wireless power includes determining whether a foreign object is detected based on a comparison of the load power and a transmitted amount of the wireless power.

In some implementations, determining the feedback parameter includes determining a pulse width ratio based on the pulse width of the one or more pulses and converting the pulse width ratio to the feedback parameter based on a predetermined translation.

In some implementations, receiving the PWM signal includes receiving a plurality of pulses occupying respective pulse time slots.

In some implementations, a duration of each pulse time slots is 0.5 milliseconds such that the pulse time slots are equivalent to a 2 kHz communication clock cycle.

In some implementations, the PWM signal includes a pulse in every other pulse time slot.

In some implementations, the one or more pulses includes at least a first pulse and a second pulse. A pulse width of the first pulse may indicate a sign of the feedback parameter. A pulse width of the second pulse may indicate a magnitude of the feedback parameter.

In some implementations, the method may include, before receiving the PWM signal, receiving a start analog control packet that indicates the PWM signal will follow the start analog control packet.

In some implementations, the method may include receiving the start analog control packet encoded as a differential bi-phase encoded signal.

In some implementations, the method may include receiving a series of sequential pulses that correspond to a predetermined pattern of pulse widths and determining that the series of sequential pulses indicates an end of the PWM signal.

In some implementations, the method may include, after the end of the PWM signal, receiving an end analog control packet or other packet encoded as a differential bi-phase encoded signal.

In some implementations, receiving the PWM signal includes receiving the PWM signal via the primary coil.

In some implementations, receiving the PWM signal includes receiving the PWM signal via a wireless communication interface that is separate from the primary coil.

In some implementations, the wireless communication interface is a short-range radio frequency interface or a near field communication interface.

In some implementations, receiving the PWM signal includes detecting a load variation during the transmission of the wireless power.

In some implementations, receiving the PWM signal includes activating a PWM communication technique for analog control based on the feedback parameter.

In some implementations, the method may include activating the PWM communication technique includes sending a first packet to the wireless power reception apparatus indicating that the wireless power transmission apparatus supports the PWM communication technique.

In some implementations, the method may include receiving a second packet from the wireless power reception apparatus indicating that the wireless power reception apparatus is activating the PWM communication technique.

Another innovative aspect of the subject matter described in this disclosure can be implemented as a method for wireless power transmission. In some implementations, the method may be performed by a wireless power reception apparatus. The method may include receiving wireless power from a wireless power transmission apparatus via at least one secondary coil of the wireless power reception apparatus. The method may include determining a feedback parameter based on the wireless power, the feedback parameter for the wireless power transmission apparatus to manage a transmission of the wireless power. The method may include communicating a pulse width modulation (PWM) signal from the wireless power reception apparatus to the wireless power transmission apparatus. The PWM signal may include one or more pulses. Each pulse may have a pulse width based, at least in part, on the feedback parameter.

In some implementations, the method may include, after communicating the PWM signal, receiving wireless power. An operating point of the wireless power transmission apparatus may be adjusted based on the feedback parameter.

In some implementations, the feedback parameter is a control error value based on a comparison of a desired control point and an actual control point.

In some implementations, communicating the PWM signal includes performing load modulation of the wireless power using a communication unit of the wireless power reception apparatus. The load modulation may be based on the pulse width of each pulse.

In some implementations, communicating the PWM signal includes performing a communication modulation using a wireless communication interface that is separate from the at least one secondary coil of the wireless power reception apparatus. The communication modulation may cause a received communication signal or a transmitted communication signal to have the one or more pulses.

In some implementations, the method may include transmitting the PWM signal includes periodically determining a new feedback parameter and periodically communicating a new pulse to the wireless power transmission apparatus. Each new pulse may have a corresponding pulse width based on the new feedback parameter.

In some implementations, transmitting the PWM signal includes converting the feedback parameter to pulse width ratio based on a predetermined translation and determining the pulse width of the one or more pulses based on the pulse width ratio.

In some implementations, communicating the PWM signal includes communicating a plurality of pulses, each pulse occupying a respective pulse time slot. A duration of each pulse time slot may be 0.5 milliseconds such that that the pulse time slots are equivalent to a 2 kHz communication clock cycle.

In some implementations, the PWM signal includes a pulse in every other pulse time slot.

In some implementations, the method may include, before communicating the PWM signal, communicating a start analog control packet that indicates the PWM signal will follow the start analog control packet.

In some implementations, the method may include communicating the start analog control packet as a differential bi-phase encoded signal.

In some implementations, the method may include communicating a series of sequential pulses that correspond to a predetermined pattern of pulse widths. The series of sequential pulses may indicate an end of the PWM signal.

In some implementations, the method may include, after the end of the PWM signal, communicating an end analog control packet or other packet encoded as a differential bi-phase encoded signal.

In some implementations, communicating the PWM signal includes communicating the PWM signal via the secondary coil.

In some implementations, communicating the PWM signal includes communicating the PWM signal via a wireless communication interface that is separate from the secondary coil.

In some implementations, the wireless communication interface is a short-range radio frequency interface or a near field communication interface.

In some implementations, the method may include, before communicating the PWM signal, activating a PWM communication technique for analog control based on the feedback parameter.

In some implementations, activating the PWM communication technique includes receiving a first packet from the wireless power transmission apparatus indicating that the wireless power transmission apparatus supports the PWM communication technique.

In some implementations, the method may include communicating a second packet to the wireless power transmission apparatus indicating that the wireless power reception apparatus is activating the PWM communication technique.

Another innovative aspect of the subject matter described in this disclosure can be implemented as a method for wireless power transmission. In some implementations, the method may be performed by a wireless power transmission apparatus. The method may include transmitting wireless power to a wireless power reception apparatus via at least one primary coil. The method may include determining a message value to communicate to the wireless power reception apparatus. The method may include determining a pulse width of one or more pulses of a pulse width modulation (PWM) signal based, at least in part, on the message value. The method may include transmitting a frequency modulated signal from the wireless power transmission apparatus to the wireless power reception apparatus based on the pulse width, whereas the frequency modulated signal has a first frequency during an on-time duration of the pulse width. The frequency modulated signal may have a second frequency during times other than the on-time duration of the pulse width.

In some implementations, the message value is an acknowledgement (ACK), non-acknowledgement (NAK), or a non-defined (ND) response.

In some implementations, the pulse width may have a first duration when the message value is the ACK. The pulse width may have a second duration when the message value is the NAK. The pulse width may have a third duration when the message value is the ND response.

In some implementations, the first duration, the second duration, and the third duration are within different ranges defined by a standard technical specification.

Another innovative aspect of the subject matter described in this disclosure can be implemented as a method for wireless power transmission. In some implementations, the method may be performed by a wireless power reception apparatus. The method may include receiving wireless power from a wireless power transmission apparatus via at least one secondary coil of the wireless power reception apparatus. The method may include receiving a frequency modulated signal from the wireless power transmission apparatus, the frequency modulated signal having one or more pulses according to a PWM signal. The method may include determining a pulse width of one or more pulses based, at least in part, a first frequency of the frequency modulated signal. The frequency modulated signal may have the first frequency during an on-time duration of the pulse width. The frequency modulated signal may have a second frequency during times other than the on-time duration of the pulse width. The method may include determining a message value based, at least in part, on the pulse width.

Another innovative aspect of the subject matter described in this disclosure can be implemented as a wireless power transmission apparatus. The wireless power transmission apparatus may have a power transfer coil, a communication unit, and a control unit. The power transfer coil, the communication unit, and the control unit may be configured to perform any one of the above-mentioned methods.

Another innovative aspect of the subject matter described in this disclosure can be implemented as a wireless power reception apparatus. The wireless power reception apparatus may have a power transfer coil, a communication unit, and a control unit. The power transfer coil, the communication unit, and the control unit may be configured to perform any one of the above-mentioned methods.

Another innovative aspect of the subject matter described in this disclosure can be implemented as a computer-readable medium having stored therein instructions which, when executed by a processor, causes the processor to perform any one of the above-mentioned methods.

Another innovative aspect of the subject matter described in this disclosure can be implemented as a system having means for implementing any one of the above-mentioned methods.

Another innovative aspect of the subject matter described in this disclosure can be implemented as an apparatus having one or more processors configured to perform one or more operations from any one of the above-mentioned methods.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

FIG. 4 shows a block diagram conceptually illustrating an example control error packet.

FIG. 5 shows a block diagram conceptually illustrating byte encoding.

FIG. 7 shows a signal diagram conceptually illustrating a differential bi-phase encoding technique for communicating a digital signal.

FIG. 8 shows a timing diagram conceptually illustrating a plurality of control error packets.

FIG. 10 shows an example relationship between a control error value and a pulse width ratio.

FIG. 11A shows example calculations for determining a pulse width to represent a control error value.

FIG. 11B shows example calculations for determining a control error value based on a pulse.

FIG. 12A shows a timing diagram conceptually illustrating signaling for a plurality of pulses.

FIG. 12B shows another timing diagram conceptually illustrating signaling for a plurality of pulses in which a pulse occurs in every other pulse time slot.

FIG. 12C shows another timing diagram conceptually illustrating signaling for a plurality of pulses in which a feedback parameter can be encoded in two pulses.

Like reference numbers and designations in the various drawings indicate like elements.

DETAILED DESCRIPTION

Figure 1:
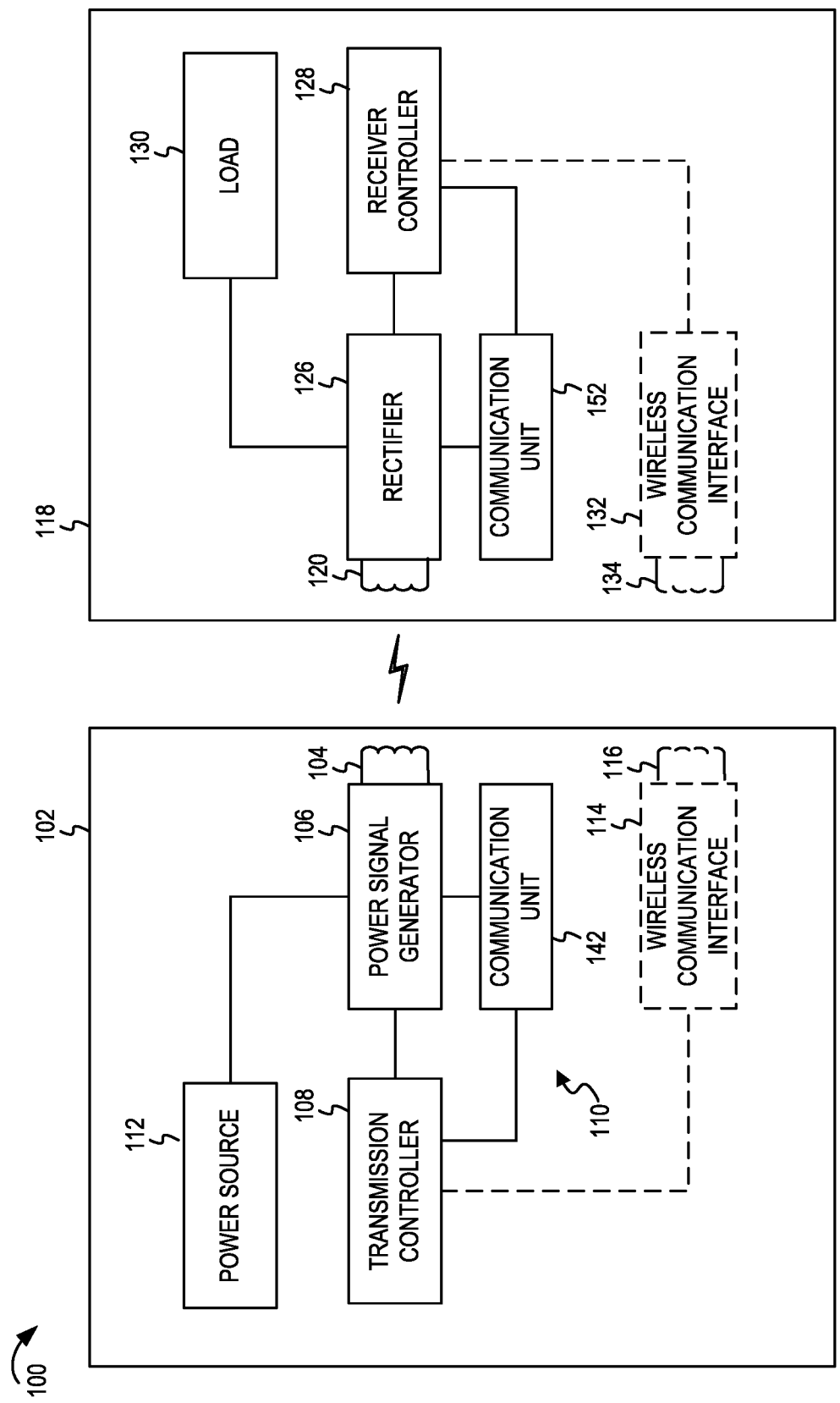
FIG. 1 shows a block diagram of an example wireless power system that includes an example wireless power transmission apparatus and an example wireless power reception apparatus.

The following description is directed to certain implementations for the purposes of describing innovative aspects of this disclosure. However, a person having ordinary skill in the art will readily recognize that the teachings herein can be applied in a multitude of different ways. The described implementations can be implemented in any means, apparatus, system, or method for transmitting or receiving wireless power.

A traditional wireless power system may include a wireless power transmission apparatus and a wireless power reception apparatus. The wireless power transmission apparatus may include one or more primary coils that transmits wireless energy (as a wireless power signal) to one or more corresponding secondary coils in the wireless power reception apparatus. A primary coil refers to a source of wireless energy (such as inductive or magnetic resonant energy producing an electromagnetic field) in the wireless power transmission apparatus. A secondary coil located in the wireless power reception apparatus may receive the wireless energy via the electromagnetic field. A transfer of wireless power may be controlled by a signal such as a control error packet (CEP) from the wireless power reception apparatus to the wireless power transmission apparatus. The wireless power transmission apparatus may periodically check whether the CEP is received within a predetermined period and may control or stop the transmission of wireless power based on the CEP. Traditional techniques for CEP have been useful for low power or slower wireless power systems. However, as wireless power systems seek to increase power levels and decrease time between adjustments, the traditional techniques for CEP may be inadequate due to delay or communication inefficiency. For brevity, some examples of this disclosure describe communication of a control error value that would otherwise be communicated in a CEP. While the examples in this disclosure relate to a control signal for a control error value transmitted from the wireless power reception apparatus to the wireless power transmission apparatus, the communication techniques in this disclosure can be used for other types of control or feedback information from the wireless power reception apparatus to the wireless power transmission apparatus. Furthermore, in some implementations, the communication techniques may be used for feedforward information from the wireless power transmission apparatus to the wireless power reception apparatus.

This disclosure provides systems, methods and apparatuses for wireless power transmission and reception. Various implementations relate generally to communication between a wireless power transmission apparatus and a wireless power reception apparatus. In some implementations, the communication techniques in this disclosure may be used as a more efficient communication of a feedback or a feedforward parameter compared to traditional techniques that use packet-based digital communication. In some implementations, a wireless power reception apparatus may communicate the feedback parameter to indicate an ongoing presence of the wireless power reception apparatus or to cause a wireless power transmission apparatus to adjust its operating point for the transmission of wireless power. For example, the feedback parameter may be a control error value. Rather than communicate the control error value as a packet-based digital communication, the control error value may be communicated more efficiently using an analog representation. In some implementations, a pulse width modulation (PWM) communication technique may include a variable sized pulse width to represent and communicate a feedback parameter. For example, a pulse width size may indicate a magnitude or other information about the feedback parameter.

A PWM communication technique may vary a pulse width of a single pulse within a predetermined pulse time slot. Each pulse may have an "on-time" duration during the pulse time slot, where the on-time duration is distinct from an "off-time" during the pulse time slot. The on-time of a pulse may have a predetermined amplitude or predetermined signal frequency to distinguish it from the off-time. A pulse width (also referred to as a pulse duration, a pulse length, or a pulse size) may refer to the on-time duration of the pulse within the pulse time slot. A pulse width ratio is a numerical representation that refers to a proportion of the pulse width (on-time duration of the pulse) to the duration of the pulse time slot. A pulse width ratio also may be referred to as a duty cycle or duty ratio associated with a single pulse within a pulse time slot. A PWM signal (also referred to as a pulse train) can include a plurality of pulses.

In accordance with examples of this disclosure, a pulse width (and thus, pulse width ratio) of a pulse may indicate a feedback parameter. For example, the pulse width ratio may indicate a magnitude or value of the feedback parameter (such as a control error value). In some implementations, the pulse width may be based on a predetermined relationship between different pulse widths and corresponding values of the feedback parameter. A wireless power reception apparatus may control a PWM modulator or switch to generate pulses that have a particular pulse width, such that the pulse width ratio of the pulse width within a pulse time slot indicates the feedback parameter. A wireless power transmission apparatus may sense the pulse width of the pulse and determine the pulse width ratio relative to the pulse time slot. The wireless power transmission apparatus may determine the feedback parameter based on the pulse width ratio. In an example in which the feedback parameter is a control error value, the pulse width ratio associated with a single pulse may indicate the control error value. In some implementations, a PWM signal may include a plurality of pulses and the pulse width ratio associated with each pulse may communicate a control error value. Therefore, changes to the control error value may be communicated frequently and quickly, enabling the wireless power transmission system to adapt to changes in the environment or power requirements.

A traditional communication technique may use amplitude shift key (ASK) modulation or frequency shift key (FSK) modulation to communicate digital information. A traditional wireless power transmission system may encode the digital information for ASK or FSK transmission. For example, a traditional wireless power reception apparatus may encode a control error value in a CEP for ASK transmission. The CEP may include at least 44 bits of digital information for a single control error value. In a typical wireless power system, the ASK transmission may be signaled according to a 2 kilohertz (kHz) frequency. Thus, each bit of digital information may take 0.5 milliseconds (ms) to communicate using traditional communication technique based on ASK modulation. To communicate a CEP having 44 bits of digital information as an ASK modulation in a traditional communication technique, a wireless power transmission system would require at least 22 ms (44 bits×0.5 ms/bit) to communicate a single control error value. In contrast, the PWM communication technique of this disclosure may communicate a control error value as a variable-sized pulse that occurs during a single pulse time slot of 0.5 ms. The pulse time slot of 0.5 ms may align with a 2 kHz frequency that would otherwise be used for the traditional communication technique. The variable-sized pulse width of a pulse within a pulse time slot can convey a full analog value rather than a single bit of information using the traditional communication technique.

In some implementations, the PWM communication technique may be referred to as an analog control feedback (or analog control). The analog control feedback may approximate a speed of a wired control line due to the efficiency of PWM to communicate a control error value or other feedback parameter. In some implementations, a communication protocol between the wireless power reception apparatus and the wireless power transmission apparatus may be adapted to support dynamic enablement or disablement of analog control. For example, a start analog control packet may be signaled using traditional ASK or FSK modulation. The start analog control packet may signal enablement of the PWM communication technique to communicate analog control information. Thereafter, the analog control information may be communicating using the PWM communication technique in lieu of ASK or FSK modulation. A predetermined pattern of PWM signaling may indicate an end of the analog control so that both the wireless power reception apparatus and the wireless power transmission apparatus can return to traditional ASK or FSK modulation for digital communication.

In some implementations, the PWM communication technique may be implemented using existing hardware in a traditional wireless power reception apparatus or a traditional wireless power transmission apparatus. For example, a communication unit of the wireless power reception apparatus may have modulation switches capable of implementing ASK based on a switch control line from a controller. To implement the PWM communication technique, the controller may control one or more of the modulation switches according to a desired pulse width within a pulse time slot. Thus, in some implementations, the PWM communication technique may be implemented with minor changes to existing systems.

In some implementations, the pulse widths of various pulses in a PWM signal can indicate different components or values of a feedback parameter. For example, some pulses (have a selected one of a plurality of predefined pulse widths) may indicate a positive or negative sign of a control error value. Other pulses (having a variable pulse width) may indicate the magnitude of the control error value. In some implementations, each pulse within a set of pulse time slots may indicate a different analog component of a feedback parameter. For example, a first pulse may indicate a coarse value and a second pulse may indicate a fine value. Additionally, or alternatively, each pulse within a set of consecutive pulses may indicate an offset value for fine grain adjustments to a value communicated one or more previous pulses within the set of consecutive pulses.

Many of the examples in this disclosure are based on a control error value communicated by a wireless power reception apparatus to a wireless power transmission apparatus using the PWM communication technique. The control error value may be used for control signaling and the wireless power transmission apparatus may set an operating point based on the control signaling. However, other types of feedback parameters also may be communicated for different use cases. For example, another example use is foreign object detection (FOD). The feedback parameter may be a load power, rectified voltage level, quality factor, quality measurement, or some indicator related to the wireless power transfer efficiency. A wireless power transmission apparatus may use the feedback parameter to determine an alignment of the power transfer coils or to detect if a foreign object is in the vicinity of the power transfer coils. The wireless power transmission apparatus may compare the feedback parameter with an amount of wireless power transmitted during a ping signal or starting wireless power signal to determine the wireless power transfer efficiency. If the wireless power transfer efficiency is below a threshold, the wireless power transmission apparatus may determine that a foreign object is detected.

Particular implementations of the subject matter described in this disclosure can be implemented to realize one or more of the following potential advantages. Thus, the PWM communication technique of this disclosure can convey a control error value (or other feedback parameter) in analog form to enable a much faster communication of control error values compared to traditional communication techniques. The efficient communication of control information enables a better user experience and faster control of wireless power transmission systems. The communication techniques in this disclosure may eliminate or reduce packet or bit-encoding overhead associated with a traditional communication technique. Thus, the PWM communication technique may avoid or reduce delays associated with traditional feedback mechanisms. These techniques also may increase responsiveness to changes in load or positioning of a wireless power reception apparatus. In high power wireless power systems, the use of an efficient communication technique (such as those described herein) may prevent faults, overheating, or degradation of charging that would otherwise occur with a traditional communication technique.

FIG. 1 shows a block diagram of an example wireless power system 100 that includes an example wireless power transmission apparatus 102 and an example wireless power reception apparatus 118. The wireless power transmission apparatus includes a primary coil 104. The primary coil 104 may be associated with a power signal generator 106. The primary coil 104 may be a wire coil which transmits wireless power (which also may be referred to as wireless energy). The primary coil 104 may transmit wireless energy using inductive or magnetic resonant field. The power signal generator 106 may include components (not shown) to provide power to the primary coil 104 causing the primary coil 104 to produce the wireless power signal. For example, the power signal generator 106 may include one or more switches, drivers, series capacitors, rectifiers or other components. The wireless power transmission apparatus 102 also may include a transmission controller 108 that controls the components of the power signal generator 106. For example, the transmission controller 108 may determine an operating point (such as voltage or current) and control the power signal generator 106 according to the operating point.

In some implementations, the power signal generator 106, the transmission controller 108 and other components (not shown) may be collectively referred to as a power transmitter circuit 110. Some or all of the power transmitter circuit 110 may be embodied as an integrated circuit (IC) that implements features of this disclosure for controlling and transmitting wireless power to one or more wireless power reception apparatuses. The transmission controller 108 may be implemented as a microcontroller, dedicated processor, integrated circuit, application specific integrated circuit (ASIC) or any other suitable electronic device.

A power source 112 may provide power to the power transmitter circuit 110 in the wireless power transmission apparatus 102. The power source 112 may convert alternating current (AC) power to direct current (DC) power. For example, the power source 112 may include a converter that receives an AC power from an external power supply and converts the AC power to a DC power used by the power signal generator 106.

A first communication unit 142 may be coupled to the components of the power signal generator 106 or the primary coil 104 to send or receive communications via the wireless power signal. The first communication unit 142 may include logic for controlling one or more switches and other components that cause transmission and reception of wireless signals via the wireless power signal. For example, the first communication unit 142 may include modulators or demodulators that convert information to ASK or FSK modulated signals. In one example, the first communication unit 142 may convert data from the transmission controller 108 into an FSK modulated signal that is combined with the wireless power signal for a communication from the wireless power transmission apparatus 102 to the wireless power reception apparatus 118. In another example, the first communication unit 142 may sense load modulated ASK signals from the power signal generator 106 or the primary coil 104 and demodulate the ASK signals to obtain data that the first communication unit 142 provides to the transmission controller 108.

In some implementations, the wireless power transmission apparatus 102 may include a wireless communication interface 114. The wireless communication interface 114 may be connected to a first communication coil 116 (which may be a coil or a loop antenna). The wireless communication interface 114 may include logic for controlling one or more switches and other components that cause transmission and reception of wireless communication signals via the first communication coil 116. In some implementations, the wireless communication interface 114 may support short range radio frequency communication (such as Bluetooth) or Near-Field Communication (NFC). NFC is a technology by which data transfer occurs on a carrier frequency of 13.56 MHz. The wireless communication unit 124 also may support any suitable communication protocol.

The transmission controller 108 may detect the presence or proximity of a wireless power reception apparatus 118. In some implementations, the presence or proximity of the wireless power reception apparatus 118 may be detected based on a load change in response to a periodic low power signal generated by the power signal generator 106 and the primary coil 104. In some implementations, the presence or proximity of the wireless power reception apparatus 118 may happen during a periodic pinging process of the wireless communication interface 114 in the wireless power transmission apparatus 102. The transmission controller 108 may receive a signal strength packet from the wireless power reception apparatus 118. The signal strength packet may indicate a rectified value of the received voltage. The transmission controller 108 may use this voltage value to check the quality of coupling between the transmitter coil and receiver coil and determine whether or not to continue providing power.

The transmission controller 108 may control characteristics of wireless power that the wireless power transmission apparatus 102 provides to the wireless power reception apparatus 118. After detecting the wireless power reception apparatus 118, the transmission controller 108 may receive information from a wireless power reception apparatus 118. For example, the transmission controller 108 may receive the information during a hand shaking process with the wireless power reception apparatus 118. The information may include information about the wireless power reception apparatus 118 (such as a power rating, the manufacturer, and model, among other examples). The transmission controller 108 may use this information to determine at least one operating control parameter (such as frequency, duty cycle, voltage, etc.) for wireless power it provides to the wireless power reception apparatus 118. To configure the wireless power, the transmission controller 108 may modify the frequency, duty cycle, voltage or any other suitable characteristic of the power signal generator 106.

The wireless power reception apparatus 118 may include a secondary coil 120, a rectifier 126, and a receiver controller 128. When the secondary coil 120 is aligned to the primary coil 104, the secondary coil 120 may generate an induced voltage based on a received wireless power signal from the primary coil 104. A capacitor may be in series between the secondary coil 120 and the rectifier 126. The rectifier 126 may rectify the induced voltage and provide the induced voltage to a load 130. In some implementations, the load 130 may be external to the wireless power reception apparatus 118 and coupled via electrical lines from the rectifier 126. Some implementations may include a series switch (not shown in FIG. 1) between the rectifier 126 and the load 130 that is capable of decoupling the load 130 from the rectifier 126.

A receiver controller 128 may be connected to the rectifier 126 and a second communication unit 152. The second communication unit 152 may be coupled to the components of the secondary coil 120 or the rectifier 126 to send or receive communications via the wireless power signal. The second communication unit 152 may include logic for controlling one or more switches and other components that cause transmission and reception of communication signals via the wireless power signals. For example, the second communication unit 152 may include modulators or demodulators that convert information to ASK or FSK modulated signals. In one example, the second communication unit 152 may convert data from the receiver controller 128 into an ASK modulated signal that used to load modulate the wireless power signal for a communication from the wireless power reception apparatus 118 to the wireless power transmission apparatus 102. In another example, the second communication unit 152 may sense FSK signals in the wireless power signal at the secondary coil 120 or the rectifier 126 and demodulate the FSK signals to obtain data that the second communication unit 152 provides to the receiver controller 128.

In some implementations, the wireless power reception apparatus 118 may include a wireless communication interface 132. The wireless communication interface 132 may contain modulation and demodulation circuits to wirelessly communicate via a second communication coil 134 (which may be a coil or a loop antenna). Thus, the receiver controller 128 may wirelessly communicate with the transmission controller 108 via the wireless communication interface 132 and the wireless communication interface 114 using NFC communications. The receiver controller 128 and the transmission controller 108 use communication to form a feedback control loop (such as, for example, the power control process 300 described with reference to FIG. 3). The receiver controller 128 may provide feedback to the transmission controller 108 (via any of the communication paths described herein) and the transmission controller 108 may adjust an operating point for the wireless power signal based on the feedback.

In some traditional wireless power systems, a primary coil can transfer wireless energy to a secondary coil up to a rating predetermined by a wireless standard. For example, a low power wireless power signal may convey 5 Watts (5 W), 9 W, 12 W, or 15 W. A low power wireless power system may deliver up to 15 Watts of energy which is suitable for many electronic devices. Higher power wireless systems are being developed to support wireless power transmission to electronic devices that require more power. For example, medium wireless power systems and high wireless power systems may deliver greater than 15 W of wireless power. The wireless power systems may benefit from improved communication and control as the power ratings of wireless power transfer systems continue to increase.

Figure 2:
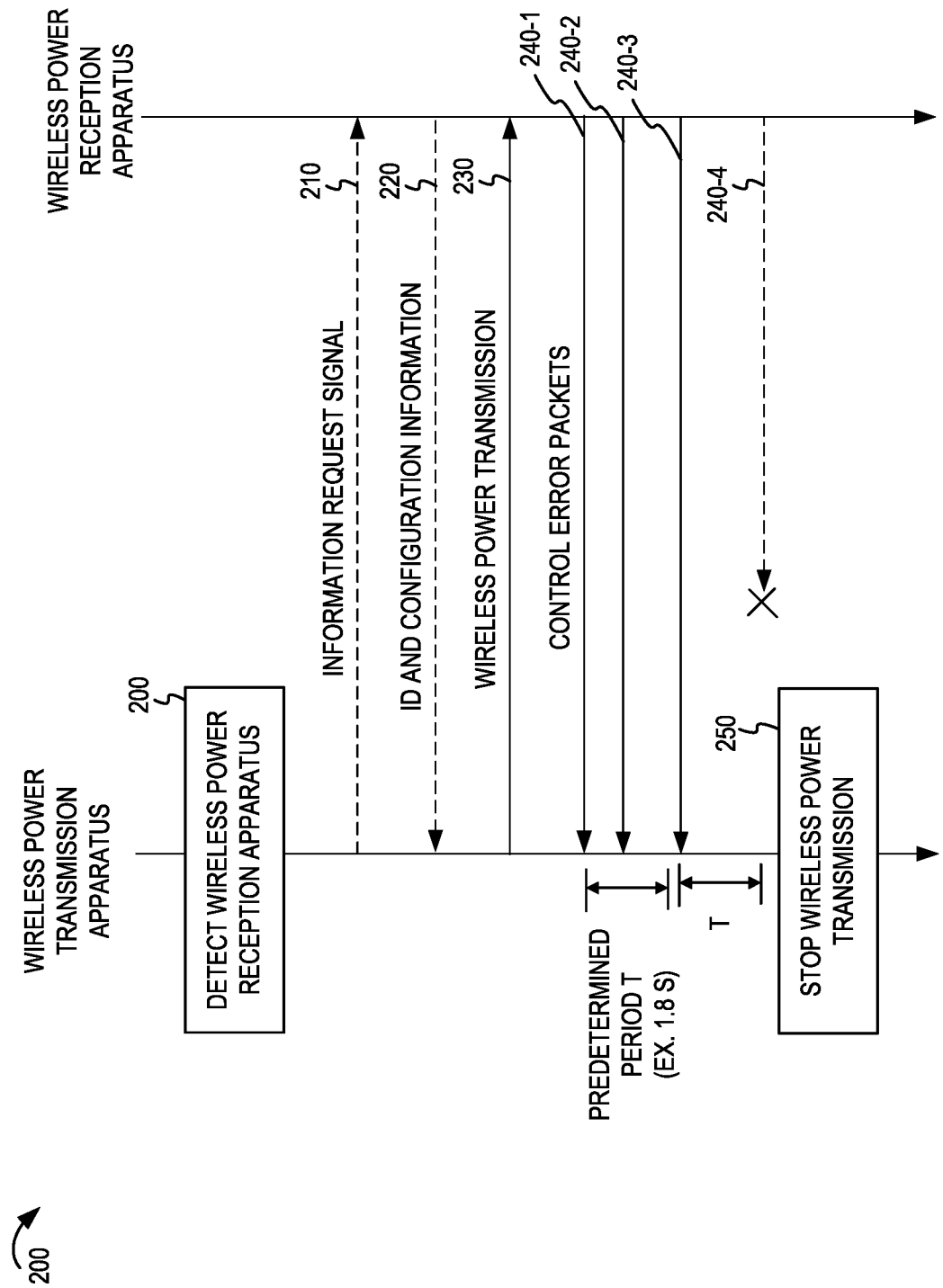
FIG. 2 shows a message flow diagram of an example wireless power transmission process.

FIG. 2 shows a message flow diagram of an example wireless power transmission process. Referring to FIG. 2, a wireless power transmission apparatus detects that a wireless power reception apparatus is located in a charging area in a standby mode (S200). There may be various methods for detecting the wireless power reception apparatus by the wireless power transmission apparatus, and not limited to a specific method in the present disclosure. As an example, the wireless power transmission apparatus may detect that the wireless power reception apparatus is located in a charging area by periodically emitting analog ping of a specific frequency, and based on detection current for this, resonance shift or capacitance change. As another example, the wireless power transmission apparatus may periodically transmit a detection signal and the wireless power reception apparatus may transmit a response signal (for example, a control error packet or a signal strength packet). The wireless power transmission apparatus may detect that the wireless power reception apparatus is located in the charging area based on receiving the response signal within a predetermined time period following the detection signal. As yet another example, the wireless power reception apparatus may transmit a searching signal or an advertisement signal to the wireless power transmission apparatus. The searching signal or the advertisement signal may traditionally be transmitted using short range radio frequency communication (such as Bluetooth™). The wireless power transmission apparatus may detect the wireless power reception apparatus based on reception of the searching signal or the advertisement signal.

In some implementations, as a preparation step for a wireless power transmission, the wireless power transmission apparatus may optionally transmit an information request signal to the wireless power reception apparatus (S210). The information request signal may be a signal for requesting an ID and requesting power information of the wireless power reception apparatus. As an example, the information request signal may be transmitted in a form of data packet message. As another example, the information request signal may be transmitted in a form of digital ping according to a predefined standard between the wireless power transmission apparatus and the wireless power reception apparatus. In response to the information request signal, the wireless power reception apparatus may optionally transmit the ID and configuration information to the wireless power transmission apparatus (S220). For example, the configuration information may include a requested amount of power or a maximum amount of power that is provided for the wireless power reception apparatus. In some implementations, the information request signal and the ID and configuration information may be communicated using out-of-band communication (separate from the wireless power signal) such as NFC or Bluetooth.

Based on the ID and configuration information, the wireless power transmission apparatus configures parameters (referred to as an operating point) for power transmission and performs a wireless power transmission to the wireless power reception apparatus (S230). For example, the wireless power transmission apparatus may create a power transmission contract based on the ID and the configuration information and may control the wireless power transmission according to the power transmission contract. The process, performed by the wireless power transmission apparatus, from the start to the end of the wireless power transmission to the wireless power reception apparatus may be called a (wireless) power transfer phase. The wireless power reception apparatus may provide the received wireless power to an external load such as a battery.

The wireless power transmission apparatus may monitor the parameters for power transmission and may abort the wireless power transmission when any one of the parameters exceeds a stated limit. Alternatively, the wireless power transmission process of S230 may be ended by a request of the wireless power reception apparatus. For example, the wireless power reception apparatus may transmit a signal for requesting termination of the wireless power transmission to the wireless power transmission apparatus, when a battery is fully charged.

During the wireless power transmission process of S230, the wireless power reception apparatus continuously transmits a control error packet (CEP) periodically or aperiodically to the wireless power transmission apparatus (S240-1, S240-2 and S240-3). This is performed for controlling an amount of power which is transmitted from the wireless power transmission apparatus to the wireless power reception apparatus, that is, to perform a power control. The power control processes like steps S240-1 to S240-3 may include the power control process according to the embodiments of FIG. 3.

FIG. 2 also illustrates the case that a control error packet is not received within a predetermined period T (such as, 1.8 sec) after the previous control error packet. The expected (but not received) control error packet is shown as S240-4. In response to not receiving the control error packet within the predetermined period T, the wireless power transmission apparatus may determine that the wireless power reception apparatus is removed from the charging area, and stops the wireless power transmission (S250). The wireless power transmission apparatus may be required to stop the wireless power transmission in the case that a user removes the wireless power reception apparatus from the charging area. Furthermore, the wireless power transmission apparatus may stop the wireless power transmission when the wireless power reception apparatus indicates a battery fully charged state.

Another problem may occur as a result of a distortion or out-of-range parameters in a control error packet or other feedback parameter. For example, while the battery is charging, in some cases a load fluctuation may cause the charge currents to be irregularly changed. Because load modulation is used to communicate the packet, the load fluctuation may cause the packet to become distorted. When such distortion occurs frequently, the wireless power transmission apparatus may drop the incorrect packets and, in some cases, may terminate the power transmission to the wireless power reception apparatus. This may cause unnecessary delays in control that may also lead to interruption of the wireless power transmission or delays in a battery charging.

Figure 3:
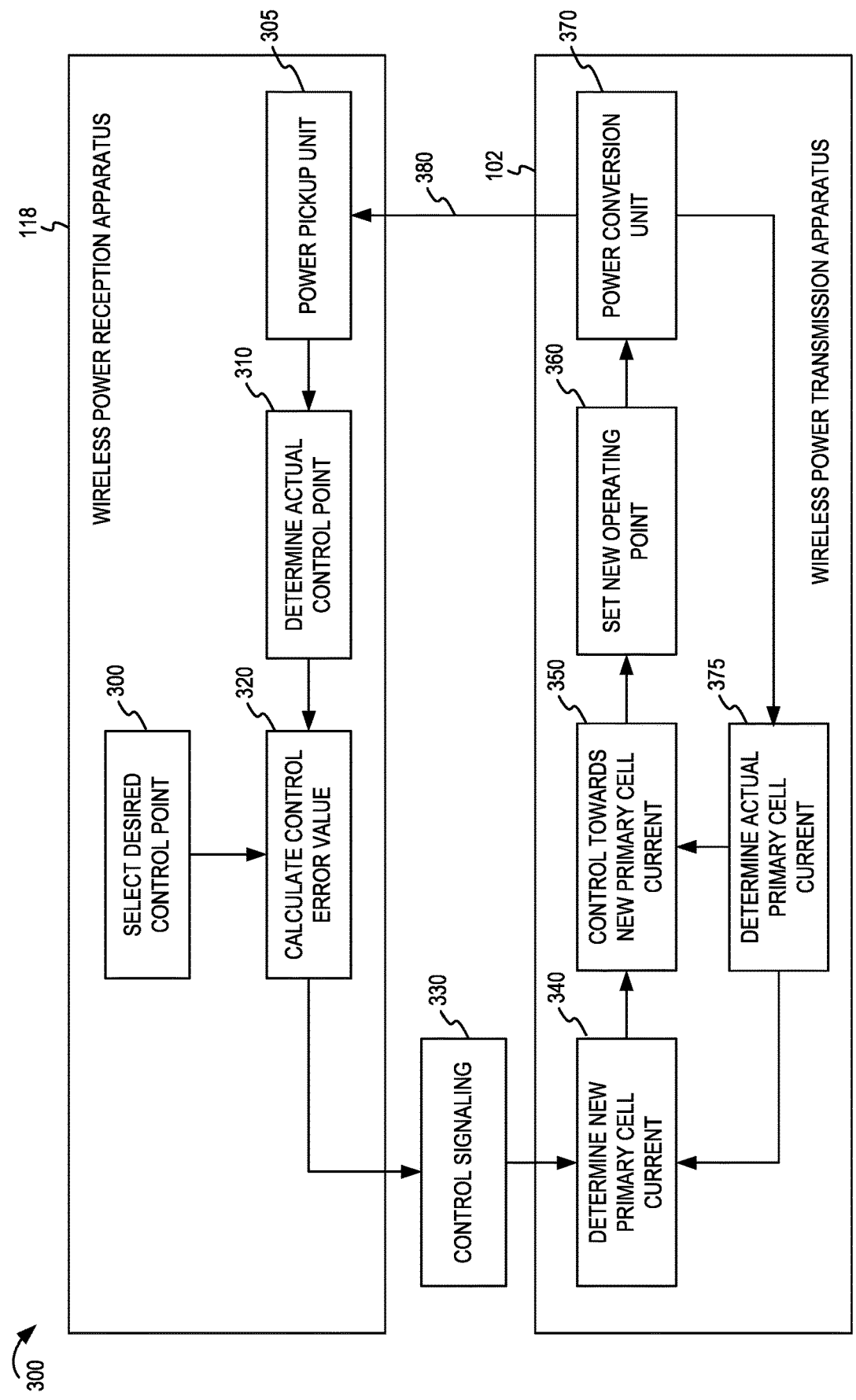
FIG. 3 shows an example of a power control process performed between a wireless power transmission device and a wireless power reception apparatus.

FIG. 3 shows an example of a power control process 300 performed between a wireless power transmission apparatus 102 and a wireless power reception apparatus 118. Referring to FIG. 3, the wireless power reception apparatus 118 selects a desired control point (S300). Here, the control point may include current and/or voltage, a temperature of a part of the wireless power reception apparatus, and so on. The wireless power reception apparatus 118 determines an actual control point based on the wireless power transmission 380 received by the power pickup unit 305 from a power conversion unit 370 of the wireless power transmission apparatus 102 (S310).

The wireless power reception apparatus 118 calculates a control error value using the desired control point and the actual control point (S320). For example, the wireless power reception apparatus 118 may calculate the control error value through the (relative) difference between a desired voltage (or current) and an actual voltage (or current). The wireless power reception apparatus 118 generates control signaling based on the control error value and transmits this to the wireless power transmission apparatus (S330). In a traditional communication technique, the control signaling 330 may be encoded in a control error packet. As described further in this disclosure, the control signaling 330 may be communicated as a PWM signal.

The wireless power transmission apparatus 102 may receive the control signaling 330 and set a new operating point based on the control error value, if it is required (S360). Here, for example, the operating point may be at least one of amplitude, a frequency and a duty cycle of an AC voltage applied to a primary coil. To determine the new operating point 360, the wireless power transmission apparatus 102 may determine a new primary cell current (S340). The new primary cell current may be based on an actual primary cell current (S375) and the control signaling 330. The wireless power transmission apparatus 102 may determine a control towards the new primary cell current (S350) and determine the new operating point (S360) to meet the new primary cell current.

The wireless power transmission apparatus 102 performs a wireless power transmission 380 to the wireless power reception apparatus 118 based on the new operating point (S370). In this case, the wireless power transmission apparatus may maintain the operating point until a new control signaling is received from the wireless power reception apparatus.

The power control process 300 described with reference to FIG. 3 can be used with a traditional communication technique or with the PWM communication technique described in this disclosure. The descriptions of FIGS. 4, 5, 7, and 8 describe how the traditional communication technique may be used to communicate the control signaling 330 of FIG. 3. The descriptions of FIGS. 9-13 include examples of the PWM communication technique to communicate the control signaling 330.

FIG. 4 shows a block diagram 400 conceptually illustrating an example control error packet. A control error value 410 may be an eight-bit value. In some implementations, the control error value 410 may be two's complement signed integer value that ranges between −128 and +127 (inclusive). Values outside the indicated range are reserved and are not included in a CEP. Rather, any values outside this range may be saturated to the boundary of the range (such as −128 or +127). In some implementations, a positive control error value may cause the wireless power transmission apparatus to increase current to its primary coil, and a negative control error value may cause the wireless power transmission apparatus to decrease the current to its primary coil. Alternatively, or additionally, a positive control error value may direct the wireless power transmission apparatus to increase its voltage. In some implementations, the voltage may be increased by decreasing an operating frequency of the wireless power signal in lieu of or in addition to increasing the voltage of the wireless power signal. A negative control error value may direct the wireless power transmission apparatus to decrease the voltage. In some implementations, the voltage may be decreased by increasing the operating frequency in lieu of or in addition to decreasing the voltage of the wireless power signal.

A CEP may include a preamble 422, a header 424, a message portion 426, and a checksum 428. The preamble 422 may be a pattern of all ONE bits. The header 424 may include a value indicating the type of packet. The message portion 426 may be populated with the control error value 410 and may be 8 bits. Similarly, the header 424 and the checksum 428 may each be 8 bits in length. The preamble 422 signals the start of a packet and may be 11 to 25 bits in length. For purposes of this disclosure, the minimum preamble 422 of 11 bits is described.

Each 8-bit portion of the header 424, the message portion 426, and the checksum 428 may be byte encoded. Byte encoding is further described with reference to FIG. 5. As a result of the byte encoding, each 8-bit portion of the header 424, the message portion 426, and the checksum 428 is encoded in 11-bits. Thus, the total length of the CEP 450 that would be signaled using a traditional communication technique is 44 modulated bits (11 modulated bits minimum for the preamble 432, 11 modulated bits for the header 434, 11 modulated bits for the message portion 436, and 11 modulated bits for the checksum 438. Each modulated bit is modulated according to a 2 kHz communication frequency such that one modulated bit is communicated per 0.5 ms. Thus, the time to modulate and transmit the full CEP is 22 ms.

FIG. 5 shows a block diagram 500 conceptually illustrating byte encoding. An 8 data bits 510 is encoded with a start bit 512, a parity bit 514, and a stop bit 516. Thus, the byte encoded bits 520 include 11 bits per byte. The start bit 512 is a ZERO. The order of the data bits is least significant bit (LSB) first. For communications from the wireless power transmission apparatus to the wireless power reception apparatus, the parity is even, which means that the parity bit is set to ONE if the data byte contains an odd number of ONE bits. Otherwise, the parity bit is set to ZERO. For communications from the wireless power reception apparatus to the wireless power transmission apparatus, the parity bit is odd. This means that the parity bit is set to ONE if the data byte contains an even number of ONE bits. Otherwise, the parity bit is set to ZERO. The stop bit is a ONE.

Figure 6:
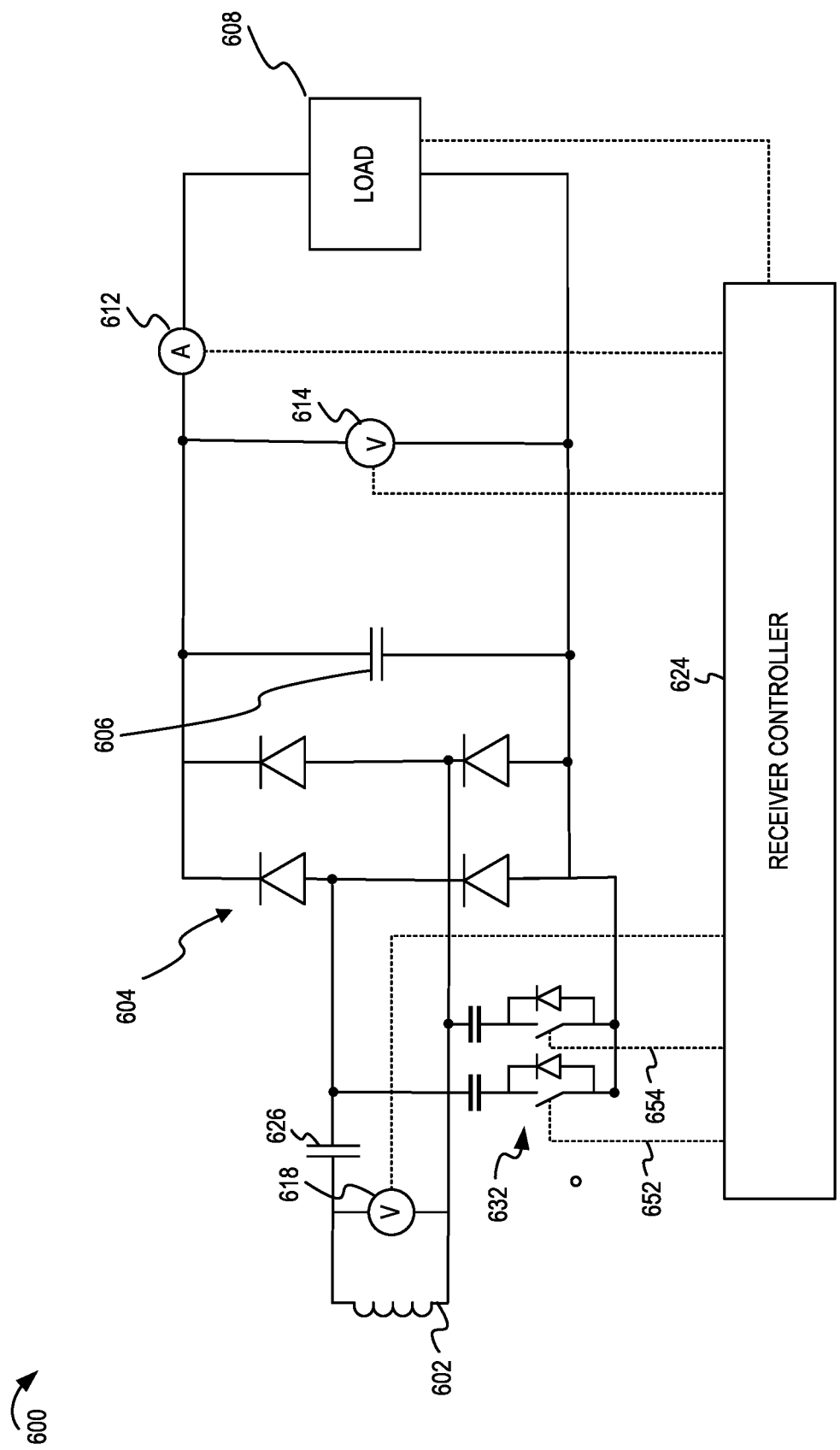
FIG. 6 shows a block diagram conceptually illustrating an example wireless power reception apparatus.

FIG. 6 shows a block diagram conceptually illustrating an example wireless power reception apparatus 600. The wireless power reception apparatus 600 may be an example of the wireless power reception apparatus 118 described with reference to FIGS. 1, 2 and 3. The wireless power reception apparatus 600 includes a secondary coil 602. The secondary coil 602 may be connected to a rectifier 604 through a series capacitor 626. The rectifier 604 may be electrically coupled to the load 608 or an energy storage device (not shown, such as a battery) through a series switch (not shown). The wireless power reception apparatus 600 also may include a communication unit 632. In some implementations, the wireless power reception apparatus 600 also may include a communication interface (not shown) connected to a communication coil (not shown). The communication unit 632 may be controlled by a receiver controller 624.

The receiver controller 624 may receive various information and determine a control error value or other feedback to communicate to a wireless power transmission apparatus via the communication unit 632. In FIG. 6, dotted lines represent control or information lines to distinguish from solid lines that represent electrical circuit lines. The control or information lines may include electrical connections to or from a receiver controller 624 and other components of the wireless power reception apparatus 600. In some implementations, the receiver controller 624 may receive information indicating load settings and power estimates from a load controller or battery management system (not shown) connected to the load 608. The receiver controller 624 also may receive first voltage information from a first voltage sensor 618 that is connected to the secondary coil 602. The first voltage information may indicate a peak voltage at the secondary coil 602. The receiver controller 624 also may receive second voltage information from a second voltage sensor 614 that is connected to the rectifier 604. The second voltage information may indicate a voltage available to the load 608. The receiver controller 624 also may receive information about current from a current sensor 612 connected to the rectifier 604. The information about current may indicate an amount of current available for the load 608.

The receiver controller 624 may transmit, to the wireless power transmission apparatus, a control error value or other information based on the first voltage information, the second voltage information, or the information about current, among other examples. In some instances, the receiver controller 624 may determine a control error value based on one or more of the load setting, a power estimate for the load, the first voltage information, the second voltage information and the information about current as part of a feedback mechanism. In some implementations, the communication unit 632 is configured to use load modulation to communicate with the wireless power transmission apparatus via a communication channel that includes the secondary coil 602. The communication channel may be used to communicate information about the receiver type, power capability, number of secondary coils, identifications of the secondary coils (such an identifier (ID) tags), load voltage, charging status, and received power from each secondary coil, among other examples. In some implementations, ASK modulation may be used on the communication path from the wireless power reception apparatus 600 to a wireless power transmission apparatus. The types of modulation described in this application are for illustrative purposes and alternative types of modulation (such as FSK modulation) may be used within the scope of this disclosure. As described herein, the communication unit 632 also may be capable of communicating an analog value using pulse width modulation. The receiver controller 624 may control the communication unit 632 using control lines 652 and 654 connected to switches in the communication unit 632. The switches may be set or unset to create various modulation signals described herein.

FIG. 7 shows a signal diagram conceptually illustrating a differential bi-phase encoding technique 700 for communicating a digital signal. A traditional communication technique based on ASK or FSK may use the differential bi-phase encoding to modulate digital information. The example in FIG. 7 is based on an ASK modulation in a traditional communication technique. A differential bi-phase encoding scheme can be used to modulate data bits onto the wireless power signal. For this purpose, the wireless power reception apparatus may align each data bit to a full period $t_{CLK}$ 712 of an internal clock signal 710 (such as from a communication clock), such that the start of a data bit coincides with the rising edge of the clock signal 710. The internal clock signal 710 may have a frequency $f_{CLK}=2^{\pm 4\%}$ kHz. The wireless power reception apparatus may encode a ONE bit using two transitions in the wireless power signal, such that the first transition coincides with the rising edge of the clock signal and the second transition coincides with the falling edge of the clock signal. Alternatively, the second transition may occur during the period $t_{CLK}$ before the falling edge of the clock signal. The wireless power reception apparatus may encode a ZERO bit using a single transition in the wireless power signal, which coincides with the rising edge of the clock signal. FIG. 7 shows examples of ONE bits 722 and 726, each of which have two transitions during their respective period $t_{CLK}$. FIG. 7 also shows examples of ZERO bits 724 and 728, each of which have only one transitions during their respective period $t_{CLK}$. Each period $t_{CLK}$ may be 0.5 ms in duration and can include either a ONE bit or a ZERO bit of digital information. The illustration in FIG. 7 is based on an amplitude modulated signal in which a load modulation may be used to modify the amplitude of a power signal.

FIG. 8 shows a timing diagram 800 conceptually illustrating a plurality of control error packets. FIG. 8 illustrates an example timing for communicating control error values via the plurality of CEPs 810, 820, and 830. Each CEP may be communicated using differential bi-phase encoding technique described with reference to FIG. 7. As described with reference to FIG. 5, each CEP 810, 820, and 830 may consist of 44 bits of digital information. Thus, the communication time for communicating each CEP 810, 820, and 830 is 22 ms. Furthermore, the wireless power reception apparatus may include a control delay of at least 29 ms between each CEP 810, 820, and 830. Thus, over approximately 104 ms, the wireless power reception apparatus may communicate three CEPs, each CEP having a single control error value. The amount of time needed to communicate one hundred (100) control error values using the CEPs would be approximately 4 seconds. As described further with reference to FIGS. 12 and 13, this traditional communication technique is quite slow compared to the PWM communication technique described in this disclosure.

Figure 9:
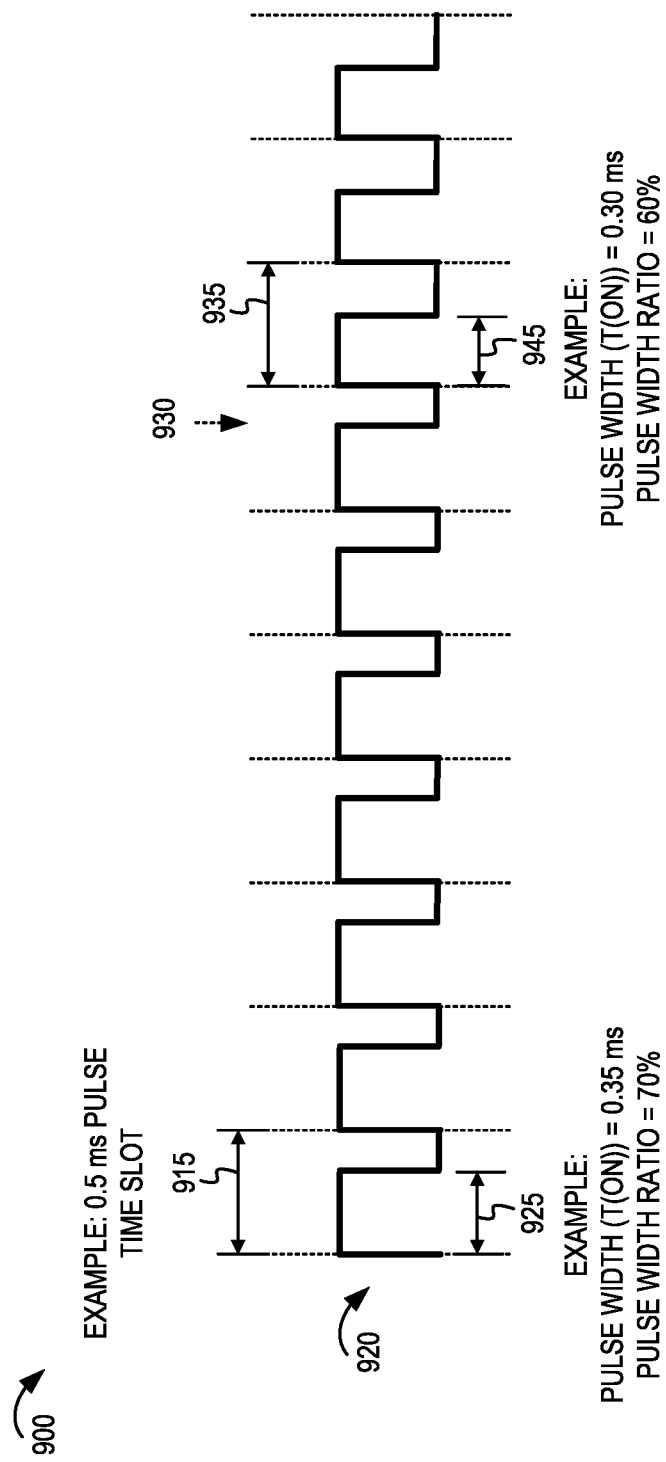
FIG. 9 shows a signal diagram conceptually illustrating an example pulse width modulation (PWM) communication technique.

FIG. 9 shows a signal diagram conceptually illustrating an example pulse width modulation (PWM) communication technique 900. FIG. 9 shows a PWM signal 920 that a first device (such as a wireless power transmission apparatus) may detect in a load modulated communication from a second device (such as a wireless power reception apparatus). In some implementations, a wireless power reception apparatus may convert a control error value to a pulse width ratio. The pulse width ratio indicates the proportion of a pulse width (the on-time duration) of a pulse within a pulse time slot. In some implementations, the pulse time slot is the same duration (0.5 ms) that would otherwise be used for a single ASK-modulated bit. FIG. 9 shows a PWM signal 920 that includes ten consecutive pulses communicated using load modulation. Each pulse occupies a pulse time slot 915 that aligns with a 0.5 ms time period that would otherwise be used for 2 kHz communication frequency. Thus, in some implementations, the PWM communication technique may use the same internal clock signal 710 (not shown) as described with reference to FIG. 7. However, rather than using a differential bi-phase encoding technique, the PWM signal 920 may use a variable pulse width to communicate an analog value. In the example of FIG. 9, load modulation may be used to modify the amplitude of a power signal according to the desired pulse width. For example, a first load may generate a first amplitude during the on-time duration of the pulse width and may generate a second amplitude for the off-time duration. Alternatively, or additionally, a change in frequency as described with reference to FIG. 17 may be used to distinguish an on-time duration of a pulse width from a remaining off-time during the pulse time slot 915.

In the example shown in FIG. 9, there are ten pulses in the PWM signal 920. Each pulse may communicate a control error value. When communicating the PWM signal 920, the wireless power reception apparatus may convert the control error value to a pulse width (using, for example, the calculations described with reference to FIG. 11A). When receiving the PWM signal 920, the wireless power transmission apparatus may detect the pulse width and determine the control error value therefrom (using, for example, the calculations described with reference to FIG. 11B). Furthermore, because each pulse represents a control error value, a change in the control error value can quickly be communicated in a subsequent pulse. For example, a pulse 925 in a first pulse time slot 915 has a pulse width ratio of 70 percent (%) of the duration of the first pulse time slot 915 (for example, 0.5 ms). Thus, the pulse 925 may have a pulse width (duration) of 0.35 ms (70 percent of the 0.5 ms duration of the first pulse time slot 915). The pulse width ratio of 70% may correspond to a particular control error value (such as 51, if using the calculations described with reference to FIGS. 11A and 11B).

Shown at time 930, the control error value may change. For example, a wireless power reception apparatus may determine a new control error value of 25 instead of the control error value of 51. After time 930, a subsequent pulse 945 may have a pulse width (duration) of 0.30 ms. The pulse width of 0.30 ms represents a pulse width ratio of 60% of the duration for the corresponding pulse time slot 935. The pulse width ratio of 60% may correspond to the new control error value (such as 25, if using the calculations described with reference to FIGS. 11A and 11B).

FIG. 10 shows an example relationship 1110 between a control error value and a pulse width ratio. A control error value of −128 may correspond to a pulse width ratio of 0% (0.0) and a control error value of 127 may correspond to a pulse width ratio of 100% (1.0). A pulse width ratio of 50% (0.5) may correspond to a control error value of 0. It should be apparent that the example translation shown in FIG. 10 is provided for pedagogical purposes and other translations may be possible. For example, negative control error values may be represented in a range of pulse width ratios from 0.5 to 1.0 and positive control error values may be represented in a range of pulse width ratios from 0.0 to 0.5. In any event, there may be a defined translation that can convert control error values between −128 and 127 to a range of pulse width ratios. For brevity, the example illustration in FIG. 10 shows a range of pulse width ratios from 0.0 to 1.0. In some implementations, the pulse width ratio of 0.0 or 1.0 may be reserved values such that the range of pulse width ratios range between a minimum value (such as 3%) and a maximum value (such as 95%).

FIG. 11A shows example calculations for determining a pulse width to represent a control error value. The wireless power reception apparatus may determine the pulse width ratio based on a formula that converts the control error value to the pulse width ratio. The wireless power reception apparatus may determine the pulse width (pulse on-time duration) by multiplying the pulse width ratio with the duration of the pulse time slot. For example, a first formula 1110 shows an example calculation (1) that converts the control error value to a pulse width ratio.

$$\text{pulse width ratio} = \frac{(\text{control error value} + 128)}{255} \quad (1)$$

A second formula 1120 shows an example calculation (2) that converts the pulse width ratio to a pulse width.

$$\text{Pulse width}(T(\text{ON})) = \text{pulse width ratio} * t_{SLOT} \quad (2)$$

Thus, a wireless power reception apparatus may control a PWM switch or modulator circuit so that the pulse width (torr) of a pulse has the desired pulse width ratio that represents the control error value.

FIG. 11B shows example calculations for determining a control error value based on a pulse. A wireless power transmission apparatus may detect the pulse and determine the pulse width ratio based on the on-time duration torr of the pulse during a pulse time slot $t_{SLOT}$. The wireless power transmission apparatus may convert the pulse width ratio to the control error value. For example, a third formula 1130 shows an example calculation (3) to determine the pulse width ratio based on a detected pulse.

$$\text{Pulse width ratio} = \frac{t_{ON}}{t_{SLOT}} \quad (3)$$

A fourth formula 1140 shows an example calculation (4) that converts the pulse width ratio to the control error value.

$$\text{control error value} = (\text{pulse width ratio} * 255) - 128 \quad (4)$$

As described further with reference to FIG. 10, the pulse width ratio may be calculated by an offset of the control error value so that negative values of the control error value can be represented in a pulse. The example offset (of negative 128) is only an example, and other translations between the control error value and the pulse width ratio are possible.

FIG. 12A shows a timing diagram 1200 conceptually illustrating signaling for a plurality of pulses. Each pulse 1201 may have a pulse width ratio that conveys an analog representation of a feedback parameter (such as a control error value). Each pulse may occupy a pulse time slot 1215 that is equivalent to a communication clock period CLK. Thus, three pulses (each pulse corresponding to a control error value) may be communicated in 1.5 ms. Approximately 100 pulses could be communicated during a 50 ms time period. Recall from the description of FIG. 8 that the traditional communication technique using CEPs modulated as digital information would take approximately 4 seconds to communicate one hundred (100) CEPs. Thus, a person of ordinary skill will readily recognize that the PWM communication technique described in this disclosure provides a much faster communication technique.

FIG. 12B shows another timing diagram 1210 conceptually illustrating signaling for a plurality of pulses in which a pulse occurs in every other pulse time slot. As shown in FIG. 12B, the pulses may be separated by an intermediate pulse time period. Thus, a pulse may occur during a first pulse time period 1215 followed by an intermediate pulse time period 1217 with no pulse. The intermediate pulse time period may be used, for example to provide time for an operating point change or a recalculation of the control error value. Using the approach described in FIG. 12B, a different control error value may be communicated by a pulse each 1 ms (0.5 ms for the pulse time slot 1215 having the pulse and 0.5 ms for the intermediate pulse time period 1217). The approximate time to communicate one hundred (100) control error values is 100 ms.

FIG. 12C shows another timing diagram 1220 conceptually illustrating signaling for a plurality of pulses in which a feedback parameter can be encoded in two pulses. A first pulse during a first pulse time slot 1225 may have a pulse width ratio representing a sign (positive or negative) of the control error value. For example, a pulse width ratio of 25% may represent a negative error value and pulse width ratio of 75% may represent a positive error value. A second pulse during a second pulse time slot 1227 may have a variable pulse width ratio representing the magnitude of control error value (without sign) encoded as a pulse width ratio between 0 and 1. Although this example uses two pulses (and thus twice the time) to convey a control error value, such an implementation may lessen the possibility of errors due to encoding noise at high powers.

Although FIG. 12C shows a control error value communicated over two pulses, other examples are possible. For example, for other types of feedback parameters, a series of consecutive pulses may indicate different components of the feedback parameter. The components may include sign and magnitude, as described in the previous example. Alternatively, or additionally, the components may include different variable values, magnitude order, coarse or fine grain adjustments, or indications, among other examples. The series of consecutive pulses may include two pulses or may include other quantities of pulses.

Figure 13:
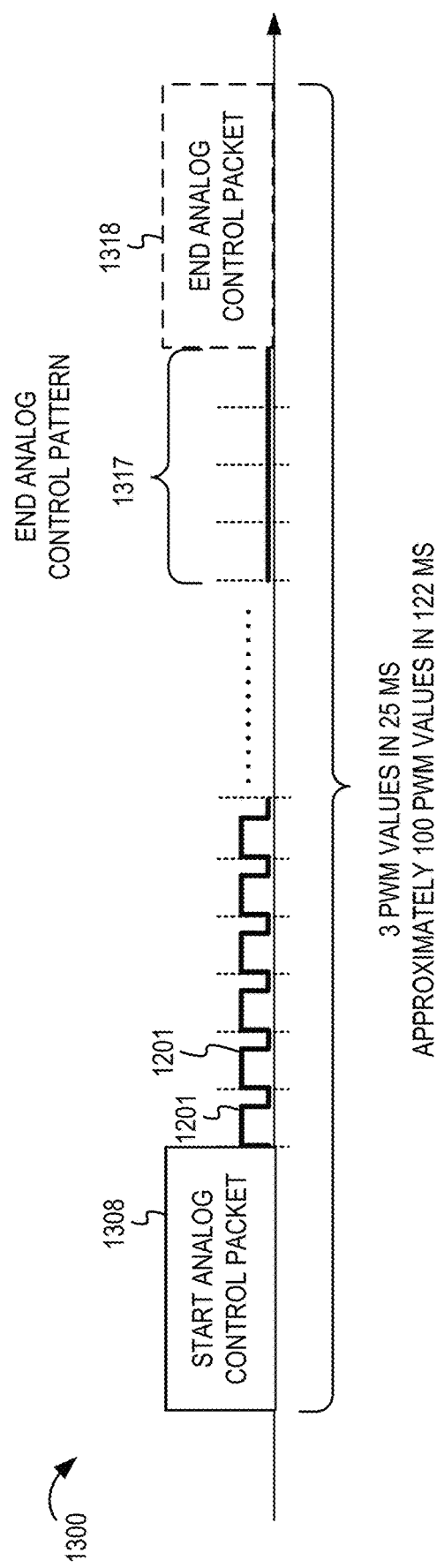
FIG. 13 shows a timing diagram conceptually illustrating signaling for activating or deactivating a PWM communication technique.

FIG. 13 shows a timing diagram 1300 conceptually illustrating signaling for activating or deactivating a PWM communication technique. When the PWM communication technique is activated, the wireless power transmission system may be referred to as using analog control. In some implementations, a wireless power transmission system may dynamically enable or disable analog control. For example, communication of identification and configuration information may utilize packet-based modulation of digital information. The packet-based modulation may use a differential bi-phase encoding technique that is well suited for the communication of digital information as bits. In some implementations, the wireless power reception apparatus and the wireless power transmission apparatus may exchange capability information that indicates whether they are capable of implementing the PWM communication technique described in this disclosure. If both apparatuses support the PWM communication technique, they may enable the PWM communication technique using a start analog control packet 1308. For example, after a handshaking and configuration process using the packet-based modulation of digital information, the wireless power reception apparatus (or the wireless power transmission apparatus) may communicate the start analog control packet 1308 to indicate that it is changing to the PWM communication technique. The start analog control packet 1308 may be formatted as a packet, similar to the CEP described with reference to FIG. 4. The start analog control packet 1308 may include a predetermined value in the header or message portion of the packet to indicate the change to the PWM communication technique. For example, the header may include a predefined value to identify the packet type of the start analog control packet 1308. Thereafter, the wireless power reception apparatus may communicate control error values (or other information) as PWM pulses 1201 as described with reference to FIG. 12A.

An end analog control pattern 1317 may signal a change back to the packet-based communication technique. The end analog control pattern 1317 may include a pattern of consecutive pulses having predetermined pulse widths or a null signal (as shown in FIG. 13) for a predetermined time. The pattern of consecutive pulses may precede an end analog control packet 1318 or other packet (not shown). For example, a series of n consecutive pulses having a same pulse width ratio may inform the wireless power transmission apparatus to begin detecting for a preamble of the end analog control packet 1318. The series of n consecutive pulses may have a reserved pulse width ratio, such as a minimum or maximum value (0.03 or 0.95) or any other predetermined reserved value.

In some implementations, the end analog control pattern 1317 may be followed by a digital end analog control packet 1318. The end analog control packet 1318 may include a digital packet containing preamble, header, message, and checksum portion. The end analog control packet 1318 may include a predetermined value in the header or message portion of the packet to indicate the change to the traditional packet-based communication technique. For example, the header may include a predefined value to identify the packet type of the end analog control packet 1318.

Figure 14:
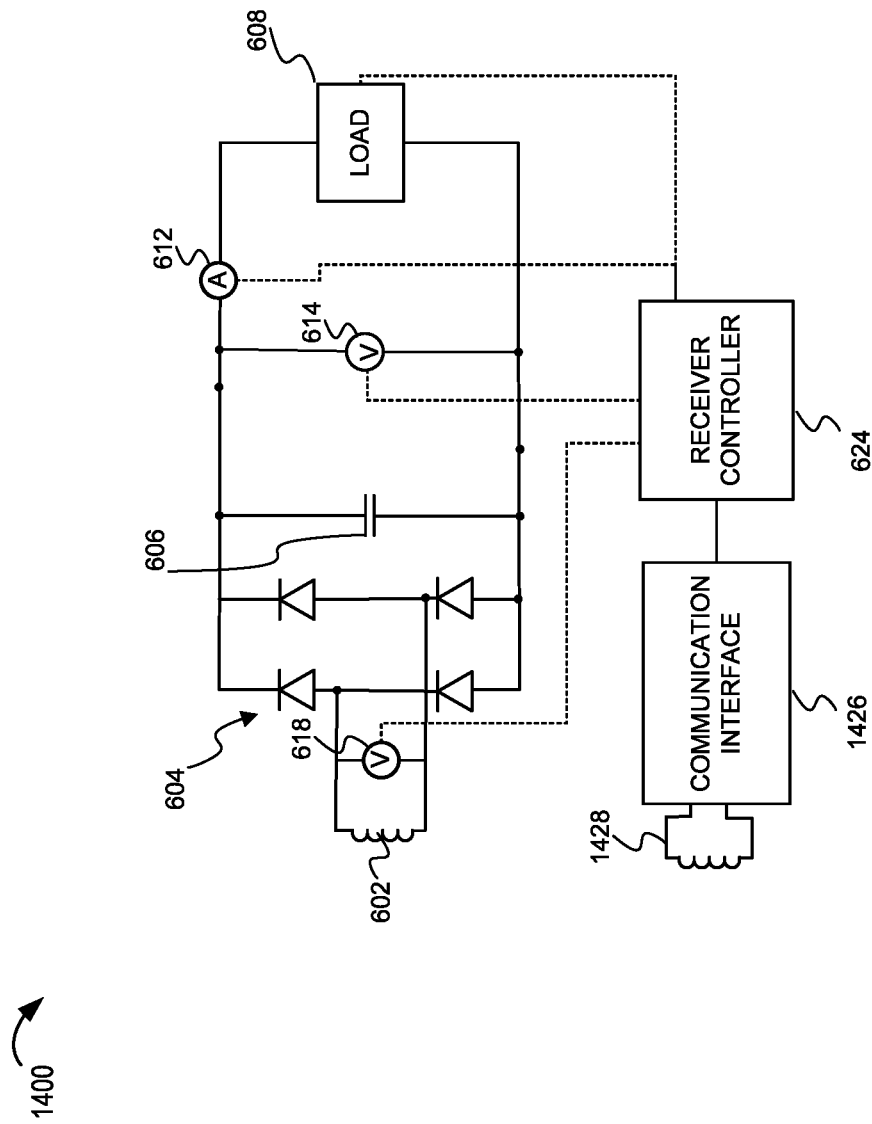
FIG. 14 shows a block diagram conceptually illustrating an example wireless power reception apparatus capable of using a PWM communication technique via an out-of-band communication channel.

FIG. 14 shows a block diagram conceptually illustrating an example wireless power reception apparatus 1400 capable of using PWM-based control signaling via an out-of-band communication channel. The components of the wireless power reception apparatus 1400 are similar to like components described with reference to the wireless power reception apparatus 600 of FIG. 6. However, the wireless power reception apparatus 1400 further includes a communication interface 1426 and a communication coil 1428. The communication coil 1428 may be a communication antenna. In some implementations, the communication interface 1426 may support Near-Field Communication (NFC) or Bluetooth communication, among other example communication protocols. The receiver controller 624 may be configured to send data to the communication interface 1426 for communication according to the communication protocol supported by the communication interface 1426. In some implementations, the communication interface 1426 may communicate the data using a PWM-based communication technique as described herein.

Figure 15:
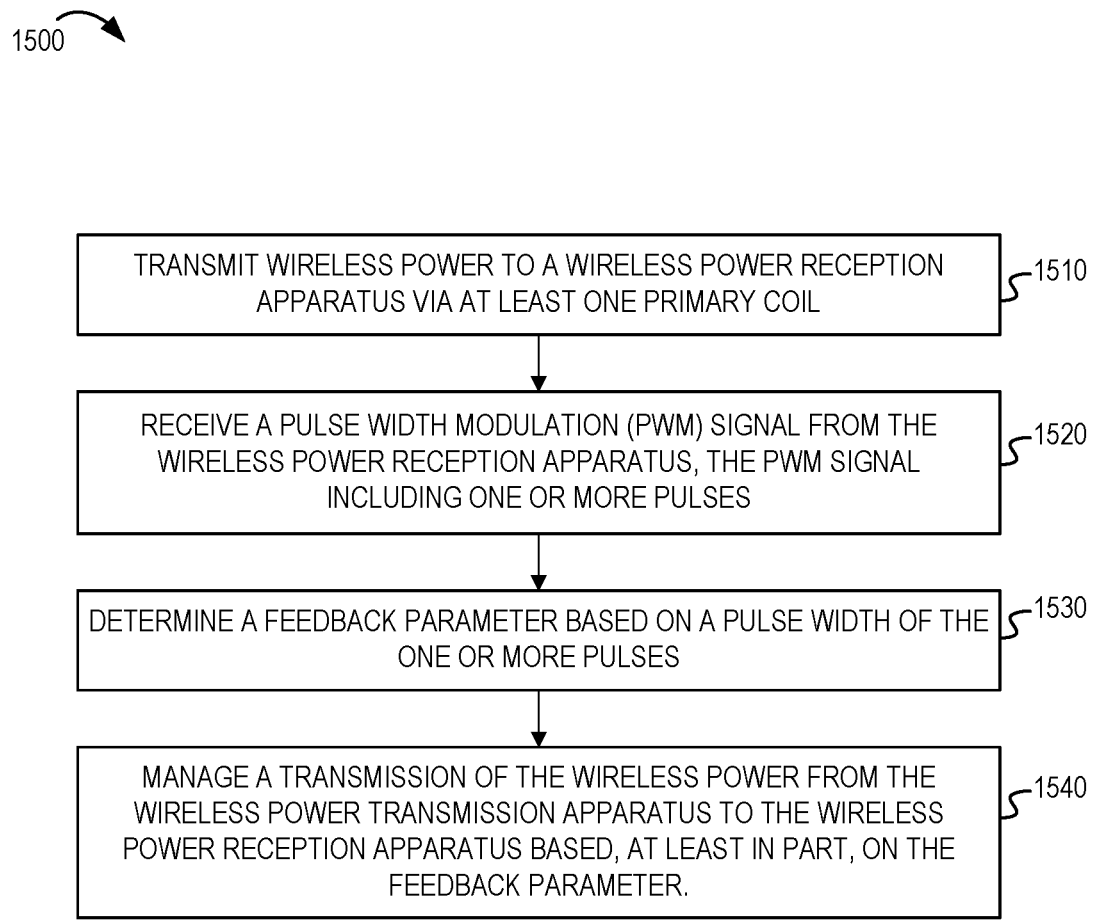
FIG. 15 shows a flow diagram illustrating example operations of a process using a PWM communication technique in a wireless power transmission apparatus.

FIG. 15 shows a flow diagram illustrating example operations of a process using a PWM communication technique in a wireless power transmission apparatus. The operations of the process 1500 may be implemented by a wireless power transmission apparatus as described herein. For example, the process 1500 may be performed by the wireless power transmission apparatus 102 described with reference to FIGS. 1, 2, and 3. In some implementations, the operations of process 1500 may be implemented by a wireless power reception apparatus, such as the wireless power reception apparatus 118 described with reference to FIGS. 1, 2, and 3, the wireless power reception apparatus 600 described with reference to FIG. 6, or the wireless power reception apparatus 1400 described with reference to FIG. 14. In some implementations, the operations of process 1500 may be implemented by an apparatus, such as the apparatus 1900 described with reference to FIG. 19. For brevity, the operations are described as performed by an apparatus.

At block 1510, the apparatus may transmit wireless power to a wireless power reception apparatus via at least one primary coil.

At block 1520, the apparatus may receive a pulse width modulation (PWM) signal from the wireless power reception apparatus. The PWM signal may include one or more pulses.

At block 1530, the apparatus may determine a feedback parameter based on a pulse width of the one or more pulses.

At block 1540, the apparatus may manage a transmission of the wireless power from the wireless power transmission apparatus to the wireless power reception apparatus based, at least in part, on the feedback parameter.

Figure 16:
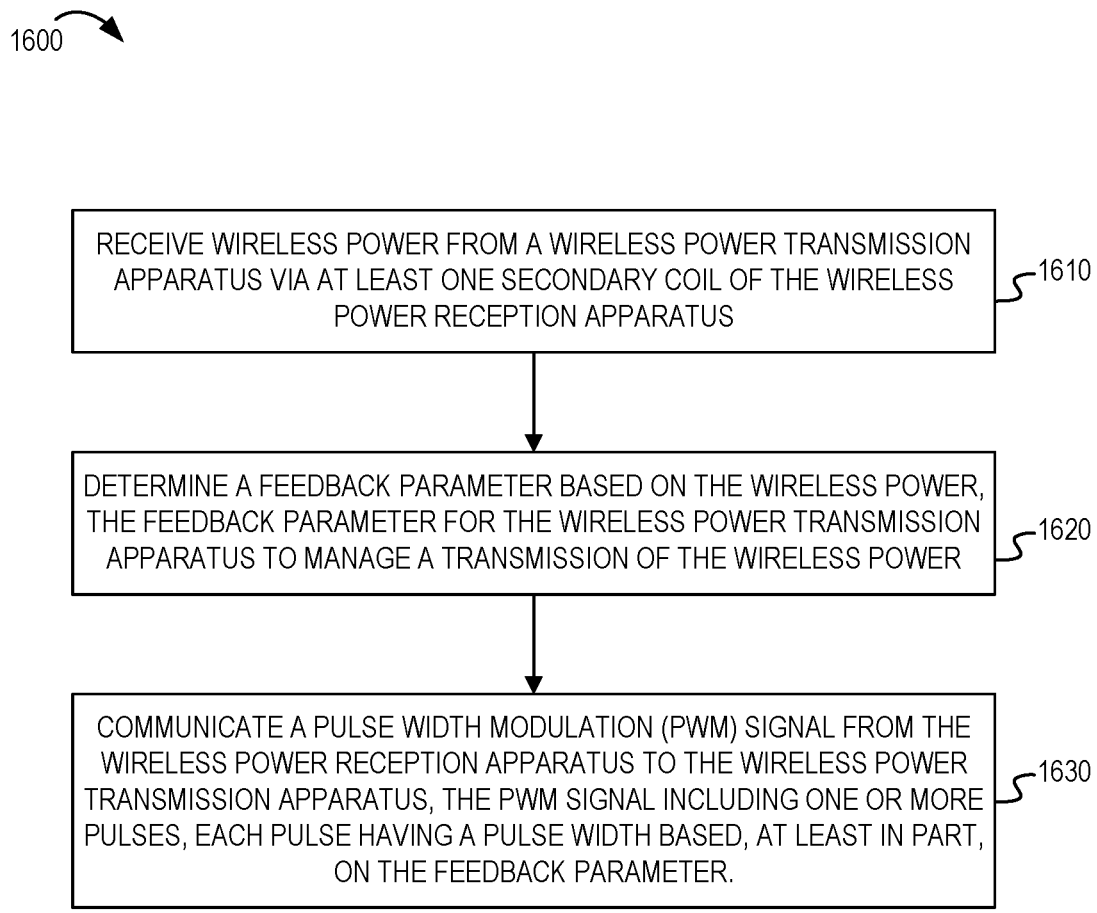
FIG. 16 shows a flow diagram illustrating example operations of a process using a PWM communication technique in a wireless power reception apparatus.

FIG. 16 shows a flow diagram illustrating example operations of a process using a PWM communication technique in a wireless power reception apparatus. The operations of the process 1600 may be implemented by a wireless power reception apparatus as described herein. For example, the operations of process 1600 may be implemented by a wireless power reception apparatus, such as the wireless power reception apparatus 118 described with reference to FIGS. 1, 2, and 3, the wireless power reception apparatus 600 described with reference to FIG. 6, or the wireless power reception apparatus 1400 described with reference to FIG. 14. In some implementations, the process 1600 may be performed by the wireless power transmission apparatus 102 described with reference to FIGS. 1, 2, and 3. In some implementations, the operations of process 1500 may be implemented by an apparatus, such as the apparatus 1900 described with reference to FIG. 19. For brevity, the operations are described as performed by an apparatus.

At block 1610, the apparatus may receive wireless power from a wireless power transmission apparatus via at least one secondary coil of the wireless power reception apparatus.

At block 1620, the apparatus may determine a feedback parameter based on the wireless power. The feedback parameter may be for the wireless power transmission apparatus to manage a transmission of the wireless power.

At block 1630, the apparatus may communicate a pulse width modulation (PWM) signal from the wireless power reception apparatus to the wireless power transmission apparatus. The PWM signal may include one or more pulses. Each pulse may have a pulse width based, at least in part, on the feedback parameter.

Figure 17:
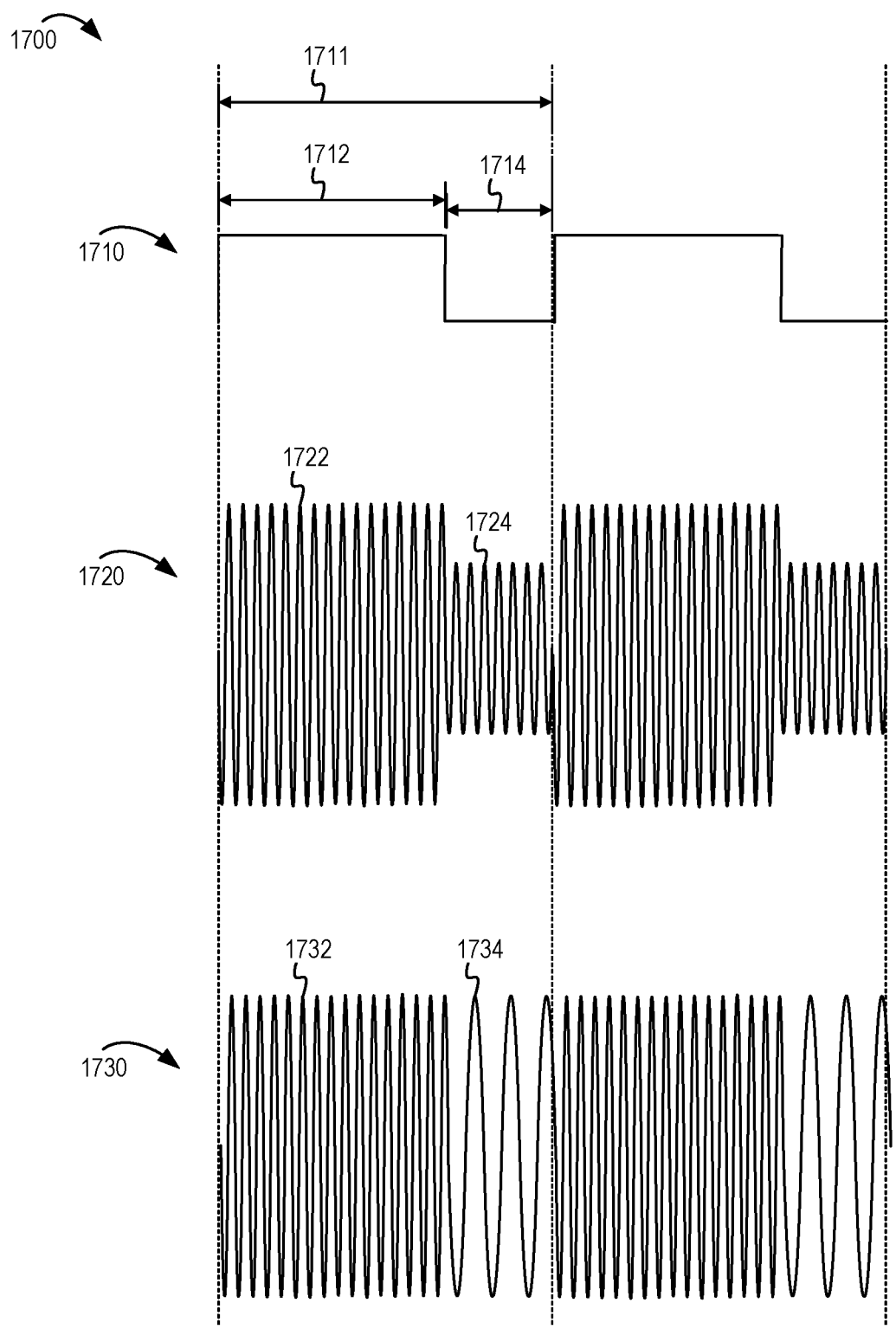
FIG. 17 shows a signal diagram conceptually illustrating an example frequency variation based on a PWM communication technique.

FIG. 17 shows a signal diagram 1700 conceptually illustrating an example frequency variation based on a PWM communication technique. Several of the examples in this disclosure have been described in relation to a load modulated signal that varies a current according to a PWM signal 1710. However, the PWM communication technique also can be used with an amplitude modulated signal 1720 or a frequency modulated signal 1730. For brevity, FIG. 17 shows a PWM signal 1710 having two pulses. Each pulse may have a pulse width having an on-time duration 1712 during a pulse time slot 1711 to distinguish from a remaining off-time 1714. In a first example, the PWM signal 1710 may be used to vary amplitude of a communication signal 1720 such that a first amplitude 1722 indicates the on-time of the pulse. A second amplitude 1724 may be used during the off time. In a second example, the PWM signal 1710 may be used to vary a frequency of a communication signal 1730 such that a first frequency 1732 during indicates the on-time of the pulse. A second frequency 1734 may be used during the off time.

Figure 18:
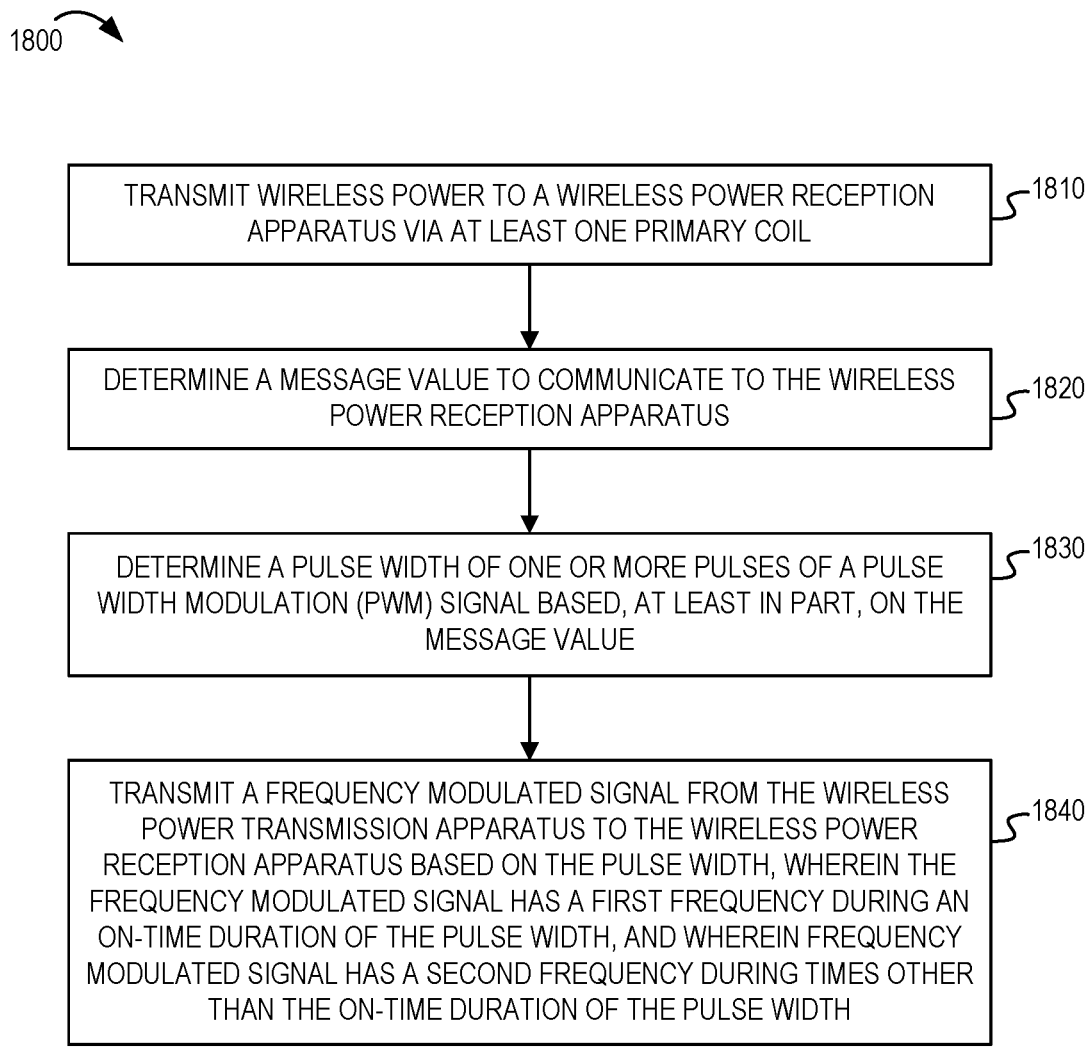
FIG. 18 shows a flow diagram illustrating example operations of another process using a PWM communication technique in a wireless power transmission apparatus.

FIG. 18 shows a flow diagram illustrating example operations of another process using PWM-based control signaling in a wireless power transmission apparatus. The operations of the process 1800 may be implemented by a wireless power transmission apparatus as described herein. For example, the process 1800 may be performed by the wireless power transmission apparatus 102 described with reference to FIGS. 1, 2, and 3. In some implementations, the operations of process 1800 may be implemented by a wireless power reception apparatus, such as the wireless power reception apparatus 118 described with reference to FIGS. 1, 2, and 3, the wireless power reception apparatus 600 described with reference to FIG. 6, or the wireless power reception apparatus 1400 described with reference to FIG. 14. In some implementations, the operations of process 1500 may be implemented by an apparatus, such as the apparatus 1900 described with reference to FIG. 19. For brevity, the operations are described as performed by an apparatus.

So far, the examples in this disclosure have been based on a feedback of control signaling from a wireless power reception apparatus to a wireless power transmission apparatus. However, the PWM-based communication techniques in this disclosure also may be used for communications from the wireless power transmission apparatus to the wireless power reception apparatus. For example, different pulse widths may be used to indicate an analog value, a predefined message, feedforward information, or other signaling from the wireless power transmission apparatus to the wireless power reception apparatus. Examples of information typically communicated from a wireless power transmission apparatus to a wireless power reception apparatus may include an acknowledgement (ACK) message value, a non-acknowledgement (NAK) message value, or a non-defined (ND) message value. Each of these signals may be associated with predefined pulse width (PWM values) that can be modulated on the wireless power signal or an out-of-band communication signal. Other types of message values may be converted to PWM values using a translation function.

At block 1810, the apparatus may transmit wireless power to a wireless power reception apparatus via at least one primary coil.

At block 1820, the apparatus may determine a message value to communicate to the wireless power reception apparatus.

At block 1830, the apparatus may determine a pulse width of one or more pulses of a pulse width modulation (PWM) signal based, at least in part, on the message value.

At block 1840, the apparatus may transmit a frequency modulated signal from the wireless power transmission apparatus to the wireless power reception apparatus based on the pulse width. The frequency modulated signal may have a first frequency during an on-time duration of the pulse width. The frequency modulated signal may have a second frequency during times other than the on-time duration of the pulse width.

Figure 19:
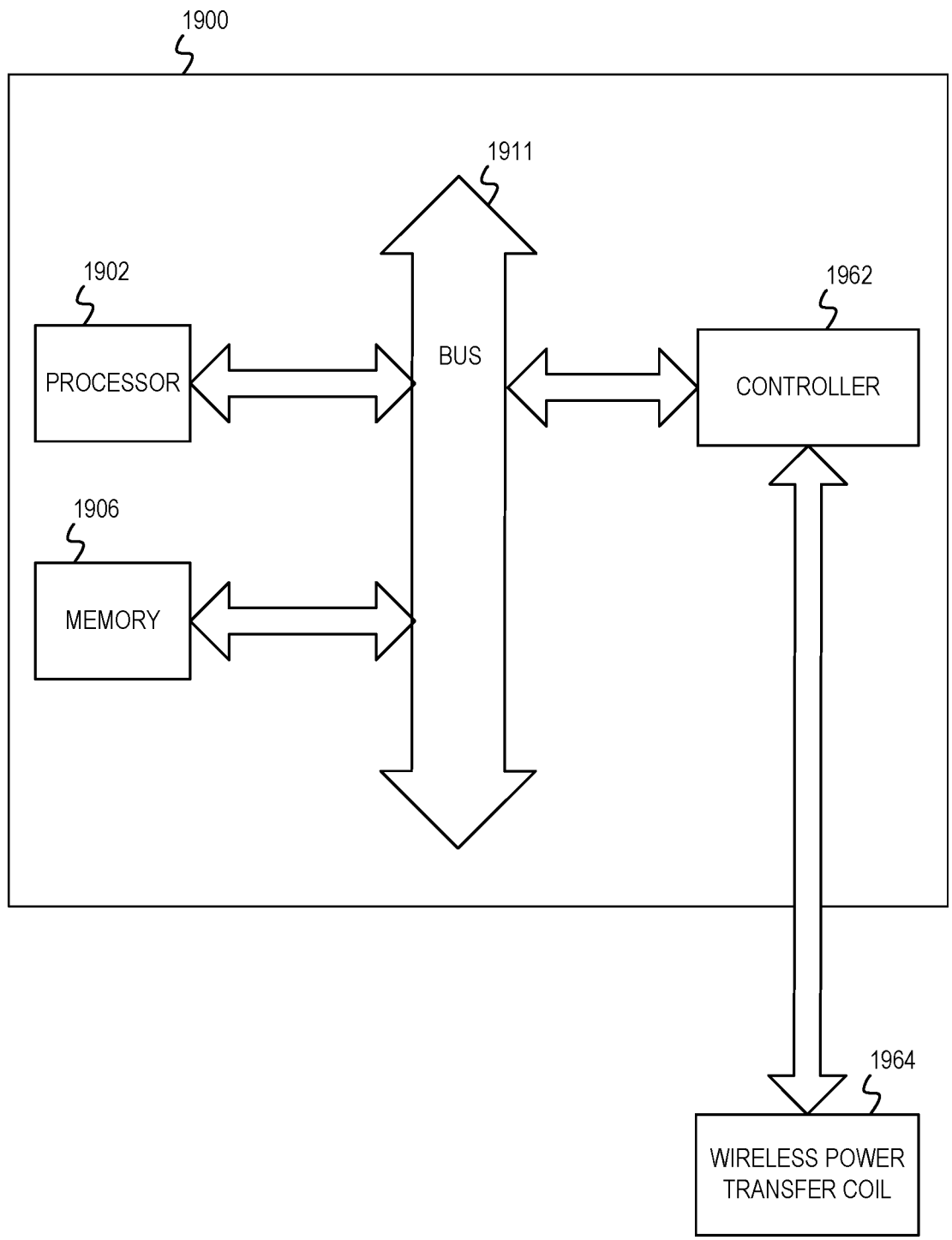
FIG. 19 shows a block diagram of an example apparatus for use in wireless power system.

FIG. 19 shows a block diagram of an example apparatus for use in wireless power system. In some implementations, the apparatus 1900 may be a wireless power transmission apparatus (such as the wireless power transmission apparatus 102) described herein. In some implementations, the apparatus 1900 may be an example of any one of the wireless power transmission apparatus 102, the wireless power reception apparatus 118, the wireless power reception apparatus 600, or the wireless power reception apparatus 1400 described herein. The apparatus 1900 can include a processor 1902 (possibly including multiple processors, multiple cores, multiple nodes, or implementing multi-threading, etc.). The apparatus 1900 also can include a memory 1906. The memory 1906 may be system memory or any one or more of the possible realizations of computer-readable media described herein. The apparatus 1900 also can include a bus 1911 (such as PCI, ISA, PCI-Express, HyperTransport®, InfiniBand®, NuBus,® AHB, AXI, etc.).

The apparatus 1900 may include one or more controller(s) 1962 configured to manage multiple primary or secondary coils (such as a coil array 1964). In some implementations, the controller(s) 1962 can be distributed within the processor 1902, the memory 1906, and the bus 1911. The controller(s) 1962 may perform some or all of the operations described herein. For example, the controller(s) 1962 may implement the processes described with reference to any one of FIG. 2, 3, 15, 16, 17, or any combination thereof.

The memory 1906 can include computer instructions executable by the processor 1902 to implement the functionality of the implementations described with reference to FIGS. 1-18. Any one of these functionalities may be partially (or entirely) implemented in hardware or on the processor 1902. For example, the functionality may be implemented with an application specific integrated circuit, in logic implemented in the processor 1902, in a co-processor on a peripheral device or card, etc. Further, realizations may include fewer or additional components not illustrated in FIG. 19. The processor 1902, the memory 1906, and the controller(s) 1962 may be coupled to the bus 1911. Although illustrated as being coupled to the bus 1911, the memory 1906 may be coupled to the processor 1902.

FIGS. 1-19 and the operations described herein are examples meant to aid in understanding example implementations and should not be used to limit the potential implementations or limit the scope of the claims. Some implementations may perform additional operations, fewer operations, operations in parallel or in a different order, and some operations differently.

The figures, operations, and components described herein are examples meant to aid in understanding example implementations and should not be used to limit the potential implementations or limit the scope of the claims. Some implementations may perform additional operations, fewer operations, operations in parallel or in a different order, and some operations differently.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The hardware and data processing apparatus used to implement the various illustrative components, logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, or any conventional processor, controller, microcontroller, or state machine. A processor also may be implemented as a combination of computing devices, for example, a combination of a DSP and a microprocessor, multiple microprocessors, one or more microprocessors in conjunction with a DSP core, or any other such configuration. In some implementations, particular processes, operations and methods may be performed by circuitry that is specific to a given function.

As described above, in some aspects of the subject matter described in this specification can be implemented as software. For example, various functions of components disclosed herein, or various blocks or steps of a method, operation, process or algorithm disclosed herein can be implemented as one or more modules of one or more computer programs. Such computer programs can include non-transitory processor-executable or computer-executable instructions encoded on one or more tangible processor-readable or computer-readable storage media for execution by, or to control the operation of, a data processing apparatus including the components of the devices described herein. By way of example, and not limitation, such storage media may include RAM, ROM, EEPROM, CD-ROM or other optical disk storage, magnetic disk storage or other magnetic storage devices, or any other medium that may be used to store program code in the form of instructions or data structures. Combinations of the above should also be included within the scope of storage media.

Various modifications to the implementations described in this disclosure may be readily apparent to persons having ordinary skill in the art, and the generic principles defined herein may be applied to other implementations without departing from the scope of this disclosure. Thus, the claims are not intended to be limited to the implementations shown herein but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method performed by a wireless power transmission apparatus, comprising:
transmitting wireless power to a wireless power reception apparatus via at least one primary coil;

receiving a first pulse width modulation (PWM) signal from the wireless power reception apparatus, the PWM signal including at least a first pulse;

determining a pulse width ratio based on an on-time duration of the first pulse within a pulse time slot for the first pulse;

determining a value of a feedback parameter based on the pulse width ratio; and managing a transmission of the wireless power from the wireless power transmission apparatus to the wireless power reception apparatus based, at least in part, on the value of the feedback parameter.

2. The method of claim 1, wherein the first pulse is for communicating a control error value as the feedback parameter, and wherein managing the transmission of the wireless power includes setting an operating point for the transmission of the wireless power based, at least in part, on the control error value.

3. The method of claim 1, wherein the first pulse is for communicating a received power as the feedback parameter, and wherein managing the transmission of the wireless power includes determining whether a foreign object is detected based on a comparison of the received power and a transmitted amount of the wireless power.

4. The method of claim 1, wherein determining the feedback parameter includes:

converting the pulse width ratio to the feedback parameter based on a predetermined translation.

5. The method of claim 1, wherein receiving the first PWM signal includes receiving a plurality of pulses occupying respective pulse time slots and wherein each pulse time slot is approximately 0.5 milliseconds.

6. The method of claim 5, wherein the first PWM signal includes a pulse in every other pulse time slot.

7. The method of claim 5, wherein the plurality of pulses includes at least the first pulse and a second pulse, wherein a first pulse width of the first pulse indicates a sign of the feedback parameter, and wherein a second pulse width of the second pulse indicates a magnitude of the feedback parameter.

8. The method of claim 1, further comprising, before receiving the first PWM signal:

communicating with the wireless power reception apparatus via differential bi-phase modulation for communication of packets;

sending a first packet to the wireless power reception apparatus indicating that the wireless power transmission apparatus supports reception of the first PWM signal for the feedback parameter; and receiving a start analog control packet that indicates the wireless power reception apparatus is activating the first PWM signal instead of differential bi-phase modulation such that the first PWM signal includes one or more pulses having pulse widths corresponding to one or more analog values of the feedback parameter.

9. The method of claim 8, further comprising, after receiving the first PWM signal:

receiving a series of sequential pulses that correspond to a predetermined pattern of pulse widths;

determining that the series of sequential pulses indicates an end of the first PWM signal; and after the end of the first PWM signal, receiving an end analog control packet or other packet encoded via the differential bi-phase modulation.

10. The method of claim 1, wherein receiving the first PWM signal includes receiving the first PWM signal via one of:

the primary coil using, wherein the wireless power transmission apparatus detects the PWM signal based on load variation during transmission of the wireless power, a wireless communication interface that is separate from the primary coil, or a short-range radio frequency interface or a near field communication interface.

11. The method of claim 1, further comprising:

determining a message value to communicate to the wireless power reception apparatus;

determining an on-time duration for a transmitted pulse based on the message value; and communicating the transmitted pulse in a second PWM signal from the wireless power transmission apparatus to the wireless power reception apparatus, wherein the transmitted pulse has a first frequency during the on-time duration of the transmitted pulse, and a second frequency during times other than the on-time duration.

12. The method of claim 11, wherein the message value is an acknowledgement (ACK), non-acknowledgement (NAK), or a non-defined (ND) response, wherein the on-time duration is a first duration when the message value is the ACK, a wherein the on-time duration is a second duration when the message value is the NAK, and wherein the on-time duration is a third duration when the message value is the ND response.

13. A method performed by a wireless power reception apparatus, comprising:

receiving wireless power from a wireless power transmission apparatus via at least one secondary coil of the wireless power reception apparatus;

determining a feedback parameter based on the wireless power, the feedback parameter for the wireless power transmission apparatus to manage a transmission of the wireless power; and communicating a pulse width modulation (PWM) signal from the wireless power reception apparatus to the wireless power transmission apparatus, the PWM signal including at least a first pulse having a pulse width ratio of between on-time duration of the first pulse and a pulse time slot for the first pulse, wherein the pulse width ratio is based, at least in part, on a value of the feedback parameter.

14. The method of claim 13, wherein transmitting the PWM signal includes:

periodically determining a new feedback parameter; and periodically communicating a new pulse to the wireless power transmission apparatus, each new pulse having a corresponding pulse width ratio based on the new feedback parameter.

15. The method of claim 13, further comprising, before communicating the PWM signal:

communicating with the wireless power transmission apparatus via differential bi-phase modulation for communication of packets;

receiving a first packet from the wireless power reception apparatus indicating that the wireless power transmission apparatus supports reception of the PWM signal for the feedback parameter; and communicating a start analog control packet to indicate the wireless power reception apparatus is activating the PWM signal to communicate one or more pulses having pulse widths corresponding to one or more analog values of the feedback parameter.

16. The method of claim 15, further comprising, after communicating the PWM signal:
- transmitting a series of sequential pulses that correspond to a predetermined pattern of pulse widths, wherein the series of sequential pulses indicates an end of the PWM signal; and
- after the end of the PWM signal, communicating an end analog control packet or other packet encoded via the differential bi-phase modulation.

17. The method of claim 13, further comprising:
- receiving a frequency modulated signal from the wireless power transmission apparatus, the frequency modulated signal having at least a second pulse, wherein the second pulse has a first frequency during an on-time duration of the second pulse, and a second frequency during times other than the on-time duration; and
- receiving a message value from the wireless power transmission apparatus based on the second pulse, wherein the message value is based, at least in part, on the on-time duration of the second pulse.

18. The method of claim 17, wherein the message value is an acknowledgement (ACK), non-acknowledgement (NAK), or a non-defined (ND) response,
- wherein the on-time duration is a first duration when the message value is the ACK, a
- wherein the on-time duration is a second duration when the message value is the NAK, and
- wherein the on-time duration is a third duration when the message value is the ND response.

19. A wireless power transmission apparatus, comprising:
- at least one primary coil configured to transmit wireless power to a wireless power reception apparatus;
- a communication unit configured to receive a pulse width modulation (PWM) signal from the wireless power reception apparatus, the PWM signal including at least a first pulse; and
- a control unit configured to:
  - determine a pulse width ratio based on an on-time duration of the first pulse within a pulse time slot for the first pulse;
  - determine a value of a feedback parameter based on the pulse width ratio; and
  - manage a transmission of the wireless power from the wireless power transmission apparatus to the wireless power reception apparatus based, at least in part, on the value of the feedback parameter.

20. A wireless power reception apparatus, comprising:
- at least one secondary coil configured to receive wireless power from a wireless power transmission apparatus;
- a control unit configured to determine a feedback parameter based on the wireless power, the feedback parameter for the wireless power transmission apparatus to manage a transmission of the wireless power; and
- a communication unit configured to communicate a pulse width modulation (PWM) signal from the wireless power reception apparatus to the wireless power transmission apparatus, the PWM signal including at least a first pulse having a pulse width ratio of between on-time duration of the first pulse and a pulse time slot for the first pulse, wherein the pulse width ratio is based, at least in part, on a value of the feedback parameter.

* * * * *